US012699439B2

(12) United States Patent
Jang et al.

(10) Patent No.: US 12,699,439 B2
(45) Date of Patent: Aug. 4, 2026

(54) DEVICE, METHOD, AND STORAGE MEDIUM FOR PERFORMING TRACKING USING EXTERNAL ELECTRONIC DEVICE

(71) Applicant: Samsung Electronics Co., Ltd., Suwon-si (KR)

(72) Inventors: Daechan Jang, Suwon-si (KR); Kihwan Kim, Suwon-si (KR); Sungoh Kim, Suwon-si (KR); Harksang Kim, Suwon-si (KR); Donghyun Yeom, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 18/802,563

(22) Filed: Aug. 13, 2024

(65) Prior Publication Data

US 2025/0085771 A1 Mar. 13, 2025

Related U.S. Application Data

(63) Continuation of application No. PCT/KR2024/010308, filed on Jul. 17, 2024.

(30) Foreign Application Priority Data

| Sep. 11, 2023 | (KR) | 10-2023-0120264 |
| Nov. 15, 2023 | (KR) | 10-2023-0158642 |
| Mar. 4, 2024 | (KR) | 10-2024-0030935 |

(51) Int. Cl.
*G09G 5/00* (2006.01)
*G02B 27/01* (2006.01)
*G06F 3/01* (2006.01)

(52) U.S. Cl.
CPC .......... *G06F 3/011* (2013.01); *G02B 27/0101* (2013.01); *G02B 27/017* (2013.01); (Continued)

(58) Field of Classification Search
CPC ... G06F 3/011; G02B 27/0101; G02B 27/017; G02B 27/0179 (Continued)

(56) References Cited

U.S. PATENT DOCUMENTS 10,365,481 B2 7/2019 Thomas et al.
10,948,299 B1 3/2021 Zhang et al.
(Continued)

FOREIGN PATENT DOCUMENTS

CN 113080560 A 7/2021
KR 10-2019-0060625 A 6/2019
(Continued)

OTHER PUBLICATIONS

International Search Report and Written Opinion dated Oct. 25, 2024, issued in International Patent Application No. PCT/KR2024/010308.
(Continued)

*Primary Examiner* — Jonathan M Blancha
(74) *Attorney, Agent, or Firm* — Jefferson IP Law, LLP

(57) ABSTRACT

A wearable device includes memory storing instructions, a sensor, a communication circuit, and at least one processor. The instructions, when executed by the at least one processor, cause the wearable device to receive first sensor information of a first external electronic device and second sensor information of a second external electronic device; obtain a first similarity value and a second similarity value; identify a compensated movement value based on the value representing the movement of the wearable device and the first sensor information; identify a compensated movement value
(Continued)

based on the value representing the movement of the wearable device and the second sensor information; and display a screen according to the compensated movement value.

20 Claims, 15 Drawing Sheets

(52) U.S. Cl.
CPC .. *G02B 27/0179* (2013.01); *G02B 2027/0138* (2013.01); *G02B 2027/0178* (2013.01); *G02B 2027/0183* (2013.01); *G02B 2027/0187* (2013.01)

(58) Field of Classification Search
USPC ........................................................ 345/156
See application file for complete search history.

(56) References Cited

U.S. PATENT DOCUMENTS

| | | | |
|---|---|---|---|
| 11,036,284 B2 | 6/2021 | Himane | |
| 11,334,148 B2 | 5/2022 | Rothkopf | |
| 11,500,470 B2 | 11/2022 | Babu et al. | |
| 11,960,661 B2 | 4/2024 | Wan | |
| 2019/0243472 A1* | 8/2019 | Stafford | G02B 27/017 |
| 2021/0033722 A1 | 2/2021 | Sondergaard et al. | |
| 2021/0357017 A1* | 11/2021 | Robinson | G06F 1/1694 |
| 2023/0100979 A1 | 3/2023 | Wan et al. | |
| 2024/0412475 A1* | 12/2024 | Kamijo | G06T 7/70 |

FOREIGN PATENT DOCUMENTS

| | | |
|---|---|---|
| KR | 10-2019-0061825 A | 6/2019 |
| KR | 10-2020-0110998 A | 9/2020 |
| KR | 10-2022-0017489 A | 2/2022 |

OTHER PUBLICATIONS

VR on a PLANE ?? 10 Tips to play Oculus Quest 2 I learned while flying for 10 hours! (Sep. 5, 2021).
HoloLens2 SLAM test in Train(Yamanote Line(Tokyo)) (Jun. 24, 2021).

* cited by examiner

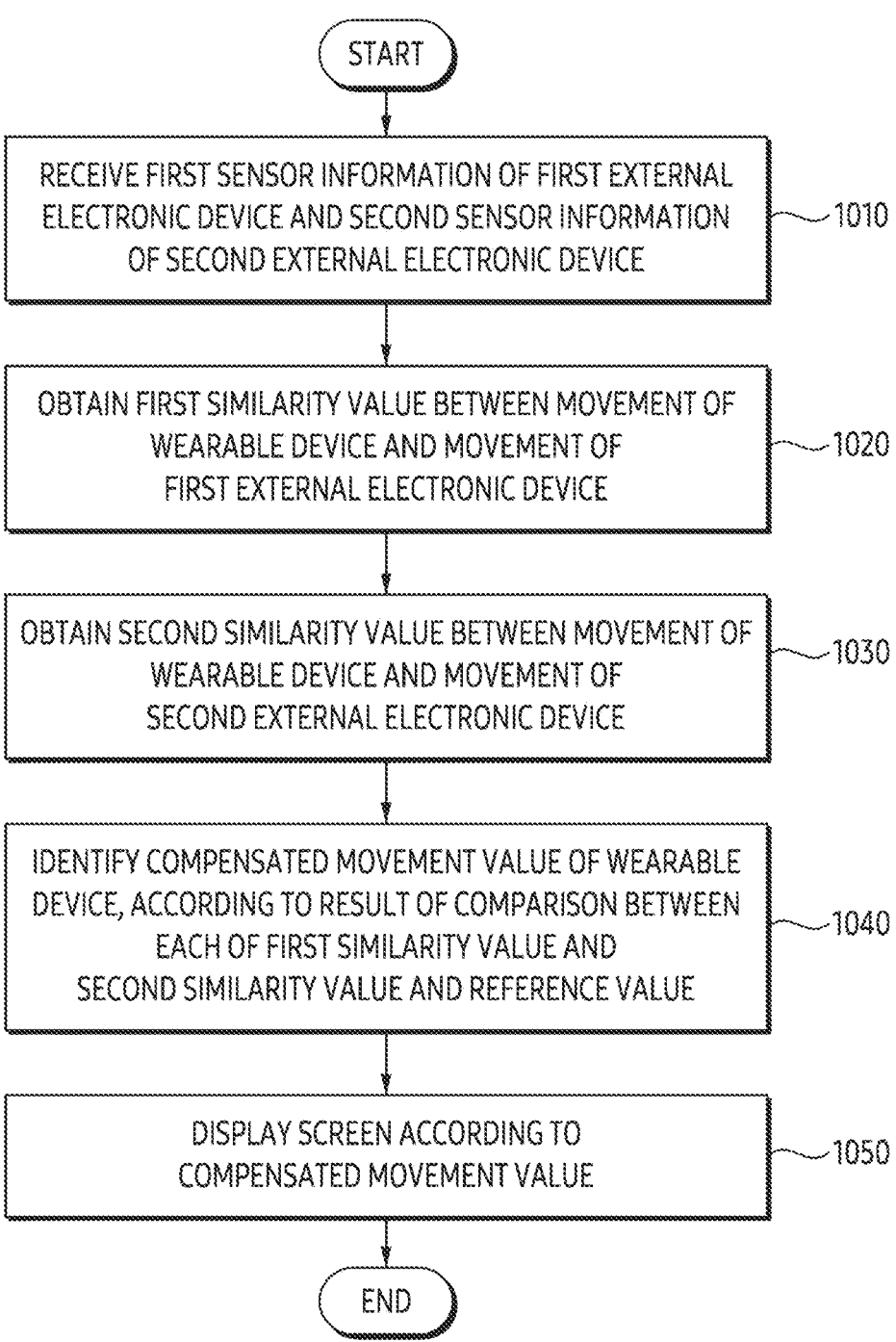

START

RECEIVE FIRST SENSOR INFORMATION OF FIRST EXTERNAL ELECTRONIC DEVICE AND SECOND SENSOR INFORMATION OF SECOND EXTERNAL ELECTRONIC DEVICE — 1010

OBTAIN FIRST SIMILARITY VALUE BETWEEN MOVEMENT OF WEARABLE DEVICE AND MOVEMENT OF FIRST EXTERNAL ELECTRONIC DEVICE — 1020

OBTAIN SECOND SIMILARITY VALUE BETWEEN MOVEMENT OF WEARABLE DEVICE AND MOVEMENT OF SECOND EXTERNAL ELECTRONIC DEVICE — 1030

IDENTIFY COMPENSATED MOVEMENT VALUE OF WEARABLE DEVICE, ACCORDING TO RESULT OF COMPARISON BETWEEN EACH OF FIRST SIMILARITY VALUE AND SECOND SIMILARITY VALUE AND REFERENCE VALUE — 1040

DISPLAY SCREEN ACCORDING TO COMPENSATED MOVEMENT VALUE — 1050

END

FIG. 10

DEVICE, METHOD, AND STORAGE MEDIUM FOR PERFORMING TRACKING USING EXTERNAL ELECTRONIC DEVICE

CROSS-REFERENCE TO RELATED APPLICATION(S)

This application is a continuation application, claiming priority under § 365 (c), of an International application No. PCT/KR2024/010308, filed on Jul. 17, 2024, which is based on and claims the benefit of a Korean patent application number 10-2023-0120264, filed on Sep. 11, 2023, in the Korean Intellectual Property Office, of a Korean patent application number 10-2023-0158642, filed on Nov. 15, 2023, in the Korean Intellectual Property Office, and of a Korean patent application number 10-2024-0030935, filed on Mar. 4, 2024, in the Korean Intellectual Property Office, the disclosure of each of which is incorporated by reference herein in its entirety.

TECHNICAL FIELD

The disclosure relates to a device, a method, and a storage medium for performing tracking using an external electronic device.

BACKGROUND ART

In order to provide enhanced user experience, an electronic device that provides an extended reality service displaying information generated by a computer in linkage with an external object in real world or a virtual object in virtual world is being developed. The electronic device may include a wearable device capable of being worn by a user. For example, the electronic device may include user equipment, augmented reality (AR) glasses, virtual reality (VR) glasses, and/or head-mounted device (HMD) (e.g., video see through (VST) HMD, optical see through (OST) HMD).

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide a device, a method, and a storage medium for performing tracking using an external electronic device.

Additional aspects will be set forth in part in the description which follows and, in part, will be apparent from the description, or may be learned by practice of the presented embodiments.

In accordance with an aspect of the disclosure, a wearable device is provided. The wearable device may comprise memory, one or more storage mediums, storing instructions. The wearable device may comprise a sensor. The wearable device may comprise a communication circuit. The wearable device may comprise at least one processor comprising processing circuitry. The instructions, when executed by the at least one processor individually or collectively, may cause the wearable device to receive, through the communication circuit, first sensor information of a first external electronic device and second sensor information of a second external electronic device. The instructions, when executed by the at least one processor individually or collectively, may cause the wearable device to obtain a first similarity value between a movement of the wearable device and a movement of the first external electronic device based on a value representing the movement of the wearable device obtained through the sensor and the first sensor information. The instructions, when executed by the at least one processor individually or collectively, may cause the wearable device to obtain a second similarity value between the movement of the wearable device and a movement of the second external electronic device based on the value and the second sensor information. The instructions, when executed by the at least one processor individually or collectively, may cause the wearable device to, in case that the first similarity value is greater than a reference value and the second similarity value is less than or equal to the reference value, identify a compensated movement value of the wearable device based on the value representing the movement of the wearable device and the first sensor information. The instructions, when executed by the at least one processor individually or collectively, may cause the wearable device to, in case that the second similarity value is greater than the reference value and the first similarity value is less than or equal to the reference value, identify a compensated movement value of the wearable device based on the value representing the movement of the wearable device and the second sensor information. The instructions, when executed by the at least one processor individually or collectively, may cause the wearable device to display a screen according to the compensated movement value.

In accordance with another aspect of the disclosure, a wearable device is provided. The wearable device may comprise memory, comprising one or more storage mediums, storing instructions. The wearable device may comprise a sensor. The wearable device may comprise a communication circuit. The wearable device may comprise at least one processor comprising processing circuitry. The instructions, when executed by the at least one processor individually or collectively, may cause the wearable device to establish, through the communication circuit, a connection with an external electronic device. The instructions, when executed by the at least one processor individually or collectively, may cause the wearable device to receive, from the external electronic device, sensor information including a sensor value and a first timing when the sensor value is obtained. The instructions, when executed by the at least one processor individually or collectively, may cause the wearable device to obtain, through the sensor, a value representing a movement of the wearable device at a second timing after the first timing. The instructions, when executed by the at least one processor individually or collectively, may cause the wearable device to calculate a first vector for the movement of the wearable device based on the value and another value obtained through the sensor at a third timing before the first timing. The instructions, when executed by the at least one processor individually or collectively, may cause the wearable device to calculate a second vector for a movement of the external electronic device based on the sensor value and another sensor value calculated with respect to the third timing. The instructions, when executed by the at least one processor individually or collectively, may cause the wearable device to obtain a similarity value between the movement of the wearable device and the movement of the external electronic device based on the first vector and the second vector. The instructions, when executed by the at least one processor individually or collectively, may cause the wearable device to adjust the value representing the movement of the wearable device using the sensor value based on the similarity value greater than a reference value.

In accordance with another aspect of the disclosure, a method performed by a wearable device is provided. The method includes receiving first sensor information of a first external electronic device and second sensor information of a second external electronic device. The method may comprise obtaining a first similarity value between a movement of the wearable device and a movement of the first external electronic device based on a value representing the movement of the wearable device and the first sensor information. The method may comprise obtaining a second similarity value between the movement of the wearable device and a movement of the second external electronic device based on the value and the second sensor information. The method may comprise adjusting the value representing the movement of the wearable device using the first sensor information, based on the first similarity value greater than a reference value and the second similarity value less than or equal to the reference value. The method may comprise, in case that the first similarity value is greater than a reference value and the second similarity value is less than or equal to the reference value, identifying a compensated movement value of the wearable device based on the value representing the movement of the wearable device and the first sensor information. The method may comprise, in case that the second similarity value is greater than the reference value and the first similarity value is less than or equal to the reference value, identifying a compensated movement value of the wearable device based on the value representing the movement of the wearable device and the second sensor information. The method may comprise displaying a screen according to the compensated movement value.

In accordance with another aspect of the disclosure, one or more non-transitory computer-readable storage media storing one or more computer programs including computer-executable instructions that, when executed by one or more processors of a wearable device individually or collectively, cause the wearable device including a sensor and a communication circuit to perform operations is provided. The operations may include receiving, through the communication circuit, first sensor information of a first external electronic device and second sensor information of a second external electronic device. The operations may include obtaining a first similarity value between a movement of the wearable device and a movement of the first external electronic device based on a value representing the movement of the wearable device obtained through the sensor and the first sensor information. The operations may include obtaining a second similarity value between the movement of the wearable device and a movement of the second external electronic device based on the value and the second sensor information. The operations may include, in case that the first similarity value is greater than a reference value and the second similarity value is less than or equal to the reference value, identifying a compensated movement value of the wearable device based on the value representing the movement of the wearable device and the first sensor information. The operations may include, in case that the second similarity value is greater than the reference value and the first similarity value is less than or equal to the reference value, identifying a compensated movement value of the wearable device based on the value representing the movement of the wearable device and the second sensor information. The operations may include displaying a screen according to the compensated movement value.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which:

FIG. 10 illustrates an example of an operation flow of a method of adjusting a value representing a movement of a wearable device based on a similarity value obtained using sensor information of external electronic devices according to an embodiment of the disclosure.

The same reference numerals are used to represent the same elements throughout the drawings.

MODE FOR INVENTION

Figure 1:
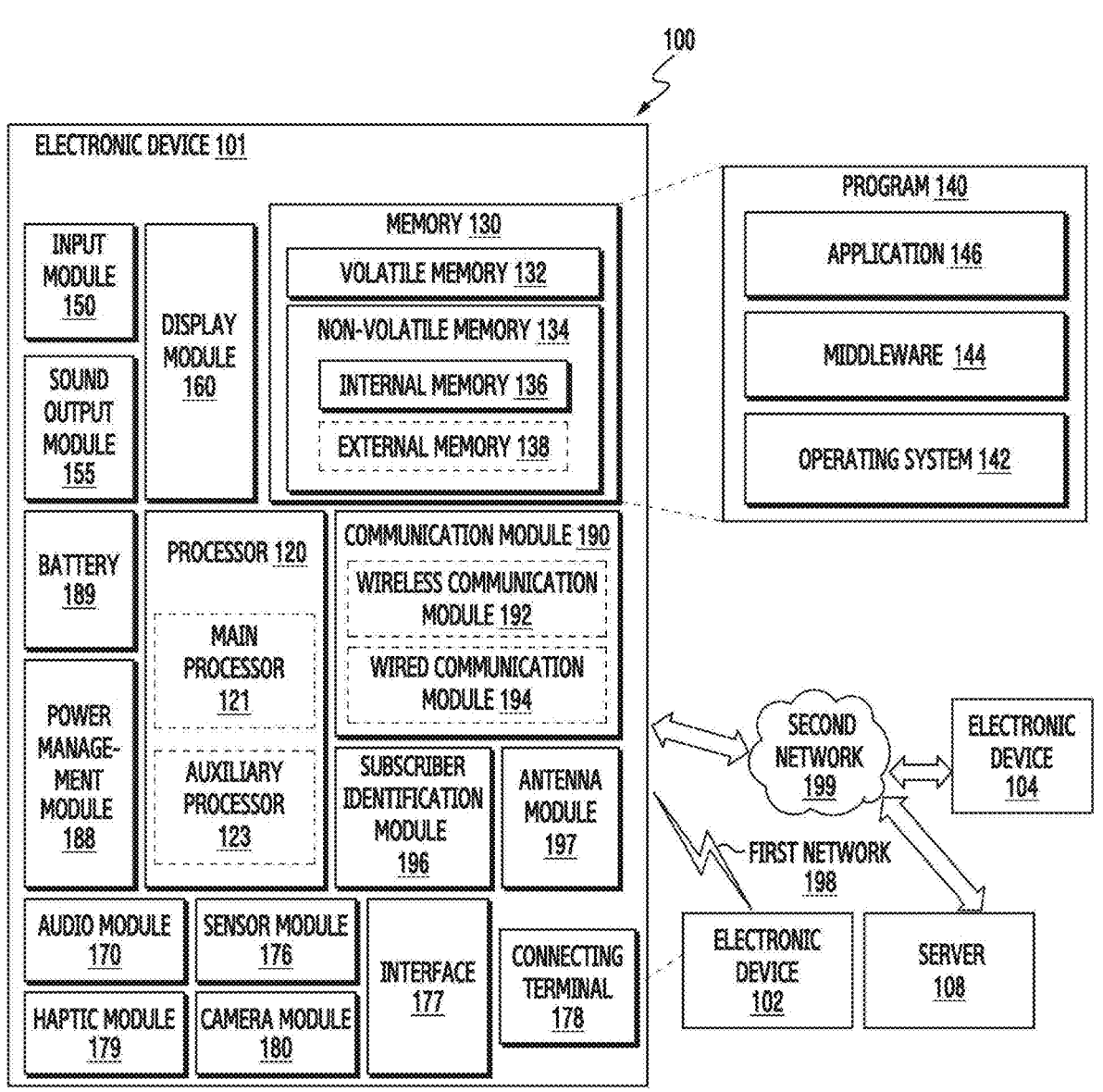
FIG. 1 is a block diagram of an electronic device in a network environment, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure described below, a hardware approach is described as an example. However, since the various embodiments of the disclosure include technology that use both hardware and software, the various embodiments of the disclosure do not exclude a software-based approach.

In addition, in the disclosure, in order to determine whether a specific condition is satisfied or fulfilled, an expression of more than or less than may be used, but this is only a description for expressing an example, and does not exclude description of more than or equal to or less than or equal to. A condition described as 'more than or equal to' may be replaced with 'more than', a condition described as 'less than or equal to' may be replaced with 'less than', and a condition described as 'more than or equal to and less than' may be replaced with 'more than and less than or equal to'. In addition, hereinafter, 'A' to 'B' means at least one of elements from A (including A) and to B (including B).

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a micropro-cessor unit (MPU), a system on chip (SoC), an integrated circuit (IC), or the like.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). In an embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123. In another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be, for example, a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may be configured to store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to another embodiment, the display module 160 may include a touch sensor adapted to detect a touch, or a pressure sensor adapted to measure the intensity of force incurred by the touch.

The audio module 170 may convert a sound into an electrical signal and vice versa. In another embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. In an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to another embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. In an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may, for example, include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. In an embodiment, the antenna module 197 may include an antenna including a radiating element composed of a conductive material or a conductive pattern formed in or on a substrate (e.g., a printed circuit board (PCB)). According to another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to still another embodiment, another component (e.g., a radio frequency integrated circuit (RFIC)) other than the radiating element may be additionally formed as part of the antenna module 197.

According to some embodiments, the antenna module 197 may form a mmWave antenna module. The mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. According to another embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may, for example, provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. The external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
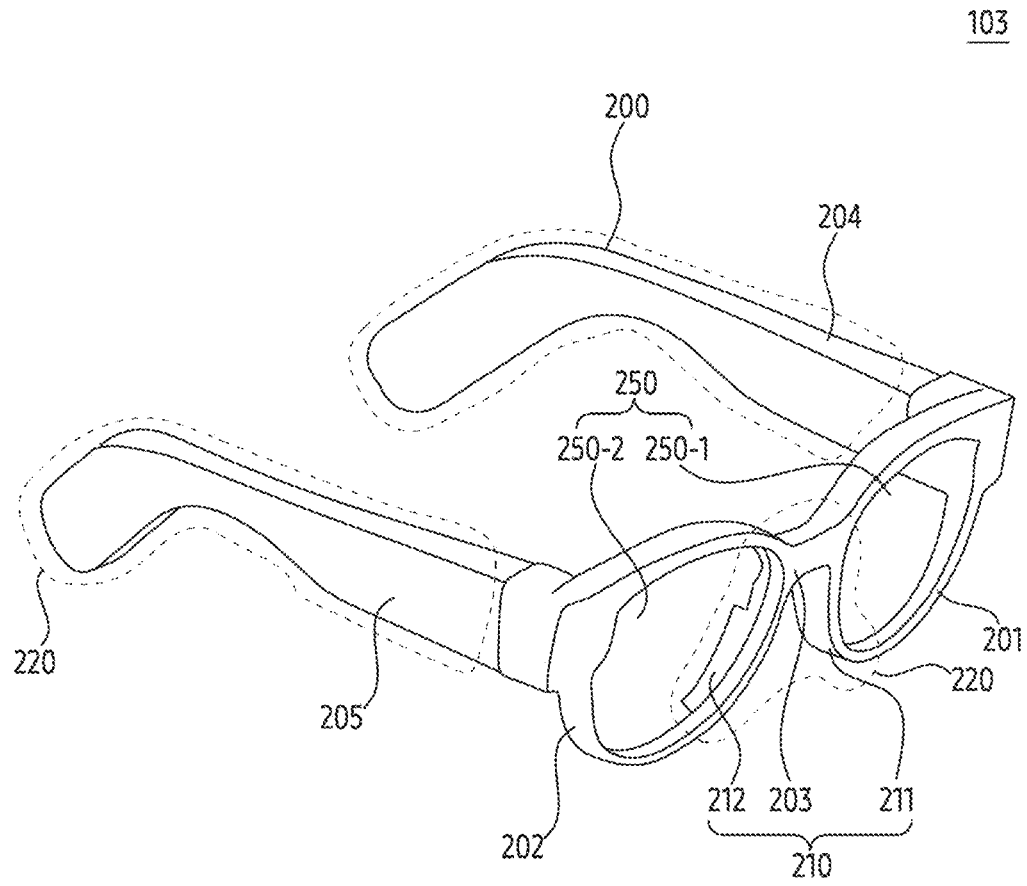
FIG. 2A illustrates an example of a perspective view of a wearable device, according to an embodiment of the disclosure.
Figure 2B:
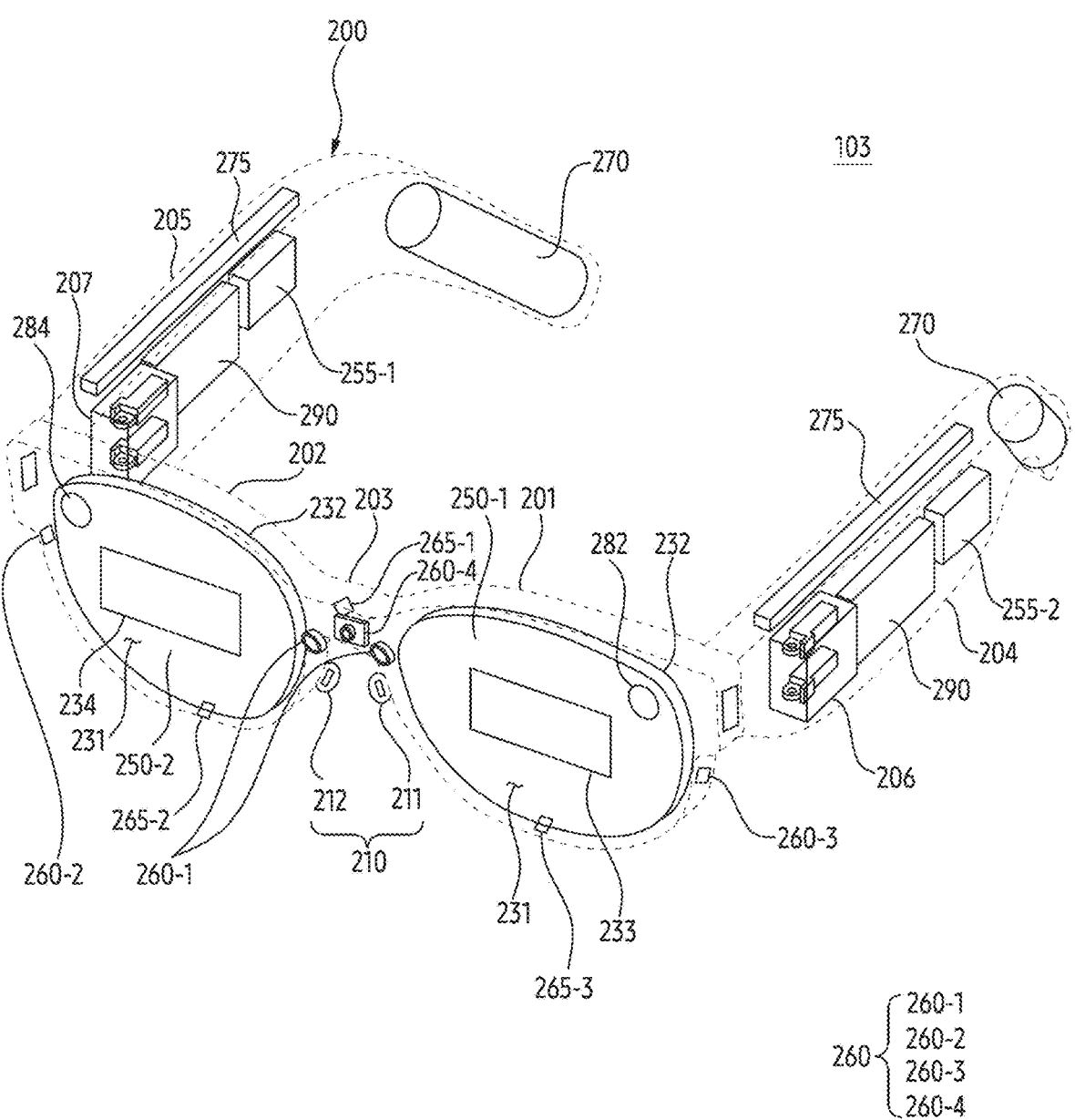
FIG. 2B illustrates an example of one or more hardware disposed in a wearable device, according to an embodiment of the disclosure.

FIG. 2A illustrates an example of a perspective view of a wearable device, according to an embodiment of the disclosure. FIG. 2B illustrates an example of one or more hardware disposed in a wearable device, according to an embodiment of the disclosure.

A wearable device 103 may have a form of glasses wearable on a user's body part (e.g., head). The wearable device 103 of FIGS. 2A and 2B may be an example of the electronic device 101 of FIG. 1. The wearable device 103 may include a head-mounted display (HMD). For example, a housing of the wearable device 103 may include a flexible material such as rubber and/or silicone having a shape to fit closely a part (e.g., a part of a face that covers both eyes) of the user's head. The housing of the wearable device 103 may include one or more straps able to be twined around the user's head, and/or one or more temples attachable to the ear of the head.

Referring to FIG. 2A, according to an embodiment, the wearable device 103 may include at least one display 250 and a frame 200 supporting the at least one display 250.

The wearable device 103 may be wearable on a portion of the user's body. The wearable device 103 may provide extended reality (XR) to a user wearing the wearable device 103. For example, the extended reality may provide augmented reality (AR), virtual reality (VR), or mixed reality (MR) combining the augmented reality and the virtual reality. For example, the wearable device 103 may display a virtual reality image provided from at least one optical device 282 and 284 of FIG. 2B on at least one display 250, in response to a user's preset gesture obtained through a motion recognition camera 260-2 and 260-3 of FIG. 2B.

According to another embodiment, the at least one display 250 may provide visual information to a user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be disposed at positions corresponding to the user's left and right eyes, respectively.

Referring to FIG. 2B, the at least one display 250 may provide visual information transmitted from external light to a user and other visual information distinguished from the above visual information, through a lens included in at least one display 250. The lens may be formed based on at least one of a fresnel lens, a pancake lens, or a multi-channel lens. The at least one display 250 may include a first surface 231 and a second surface 232 opposite to the first surface 231. A display area may be formed on the second surface 232 of at least one display 250. When the user wears the wearable device 103, ambient light may be transmitted to the user by being incident on the first surface 231 and being penetrated through the second surface 232. For example, the at least one display 250 may display an augmented reality image in which a virtual reality image provided by the at least one optical device 282 and 284 is combined with a reality screen transmitted through external light, on a display area formed on the second surface 232.

The at least one display 250 may include at least one waveguide 233 and 234 that transmits light transmitted from the at least one optical device 282 and 284 by diffracting to the user. The at least one waveguide 233 and 234 may be formed based on at least one of glass, plastic, or polymer. A nano pattern may be formed on at least a portion of the outside or inside of the at least one waveguide 233 and 234. The nano pattern may be formed based on a grating structure having a polygonal or curved shape. Light incident to an end of the at least one waveguide 233 and 234 may be, for example, propagated to another end of the at least one waveguide 233 and 234 by the nano pattern. The at least one waveguide 233 and 234 may include at least one of at least one diffraction element (e.g., a diffractive optical element (DOE), a holographic optical element (HOE)), and a reflection element (e.g., a reflection mirror). For example, the at least one waveguide 233 and 234 may be disposed in the wearable device 103 to guide a screen displayed by the at least one display 250 to the user's eyes. For another example, the screen may be transmitted to the user's eyes through total internal reflection (TIR) generated in the at least one waveguide 233 and 234.

The wearable device 103 may analyze an object included in a real image collected through a photographing camera 260-4, combine with a virtual object corresponding to an object that become a subject of augmented reality provision among the analyzed object, and display on the at least one display 250. The virtual object may include at least one of text and images for various information associated with the object included in the real image. The wearable device 103 may, for example, analyze the object based on a multi-camera such as a stereo camera. For the object analysis, the wearable device 103 may execute space recognition (e.g., simultaneous localization and mapping (SLAM) using the multi-camera and/or time-of-flight (ToF). The user wearing the wearable device 103 may watch an image displayed on the at least one display 250.

In an embodiment, a frame 200 may be configured with a physical structure in which the wearable device 103 may be worn on the user's body. In another embodiment, the frame 200 may be configured so that when the user wears the wearable device 103, the first display 250-1 and the second display 250-2 may be positioned corresponding to the user's left and right eyes. The frame 200 may support the at least one display 250. For example, the frame 200 may support the first display 250-1 and the second display 250-2 to be positioned at positions corresponding to the user's left and right eyes.

Referring to FIG. 2A, according to an embodiment, the frame 200 may include an area 220 at least partially in contact with the portion of the user's body in case that the user wears the wearable device 103. For example, the area 220 of the frame 200 in contact with the portion of the user's body may include an area in contact with a portion of the user's nose, a portion of the user's ear, and a portion of the side of the user's face that the wearable device 103 contacts. The frame 200 may include a nose pad 210 that is contacted on the portion of the user's body. When the wearable device 103 is worn by the user, the nose pad 210 may be contacted on the portion of the user's nose. The frame 200 may include a first temple 204 and a second temple 205 that is contacted on another portion of the user's body that is distinct from the portion of the user's body.

The frame 200 may include a first rim 201 surrounding at least a portion of the first display 250-1, a second rim 202 surrounding at least a portion of the second display 250-2, a bridge 203 disposed between the first rim 201 and the second rim 202, a first pad 211 disposed along a portion of the edge of the first rim 201 from one end of the bridge 203, a second pad 212 disposed along a portion of the edge of the second rim 202 from the other end of the bridge 203, the first temple 204 extending from the first rim 201 and fixed to a portion of the wearer's ear, and the second temple 205 extending from the second rim 202 and fixed to a portion of the ear opposite to the ear. The first pad 211 and the second pad 212 may be, for example, in contact with the portion of the user's nose, and the first temple 204 and the second temple 205 may be in contact with a portion of the user's face and the portion of the user's ear. The temples 204 and 205 may be rotatably connected to the rim through hinge units 206 and 207 of FIG. 2B. The first temple 204 may be rotatably connected with respect to the first rim 201 through the first hinge unit 206 disposed between the first rim 201 and the first temple 204. The second temple 205 may be rotatably connected with respect to the second rim 202 through the second hinge unit 207 disposed between the second rim 202 and the second temple 205. According to another embodiment, the wearable device 103 may identify an external object (e.g., a user's fingertip) touching the frame 200 and/or a gesture performed by the external object by using a touch sensor, a grip sensor, and/or a proximity sensor formed on at least a portion of the surface of the frame 200.

The wearable device 103 may include hardware (e.g., hardware to be described later based on the block diagram of FIG. 5) that performs various functions. The hardware may include a battery module 270, an antenna module 275, the at least one optical device 282 and 284, speakers (e.g., speakers 255-1 and 255-2), a microphone (e.g., microphones 265-1, 265-2, and 265-3), a light emitting module (not illustrated), and/or a printed circuit board (PCB) 290 (e.g., printed circuit board). Various hardware may be disposed in the frame 200.

In an embodiment, the microphone (e.g., the microphones 265-1, 265-2, and 265-3) of the wearable device 103 may obtain a sound signal, by being disposed on at least a portion of the frame 200. The first microphone 265-1 disposed on the bridge 203, the second microphone 265-2 disposed on the second rim 202, and the third microphone 265-3 disposed on the first rim 201 are illustrated in FIG. 2B, but the number and disposition of the microphone 265 are not limited to an embodiment of FIG. 2B. In case that the number of the microphone 265 included in the wearable device 103 is two or more, the wearable device 103 may identify the direction of the sound signal by using a plurality of microphones disposed on different portions of the frame 200.

In another embodiment, the at least one optical device 282 and 284 may project a virtual object on the at least one display 250 in order to provide various image information to the user. For example, the at least one optical device 282 and 284 may be a projector. The at least one optical device 282 and 284 may be disposed adjacent to the at least one display 250 or may be included in the at least one display 250 as a portion of the at least one display 250. In yet another embodiment, the wearable device 103 may include a first optical device 282 corresponding to the first display 250-1, and a second optical device 284 corresponding to the second display 250-2. For example, the at least one optical device 282 and 284 may include the first optical device 282 disposed at a periphery of the first display 250-1 and the second optical device 284 disposed at a periphery of the second display 250-2. The first optical device 282 may transmit light to the first waveguide 233 disposed on the first display 250-1, and the second optical device 284 may transmit light to the second waveguide 234 disposed on the second display 250-2.

A camera 260 may include the photographing camera 260-4, an eye tracking camera (ET CAM) 260-1, and/or the motion recognition camera 260-2 and camera 260-3. The photographing camera 260-4, the eye tracking camera 260-1, and the motion recognition camera 260-2 and camera 260-2 may be disposed at different positions on the frame 200 and may perform different functions. The eye tracking camera 260-1 may output data indicating a position of eye or the gaze of the user wearing the wearable device 103. The wearable device 103 may detect the gaze from an image including the user's pupil obtained through the eye tracking camera 260-1. The wearable device 103 may, for example, perform a gaze interaction with at least one object, by using the user's gaze obtained through the eye tracking camera 260-1. The wearable device 103 may represent a portion corresponding to eye of an avatar indicating the user in the virtual space, by using the user's gaze obtained through the eye tracking camera 260-1. The wearable device 103 may render an image (or a screen) displayed on the at least one display 250, based on the position of the user's eye. For example, visual quality of a first area related to the gaze within the image and visual quality (e.g., resolution, brightness, saturation, grayscale, and PPI) of a second area distinguished from the first area may be different. For example, when the wearable device 103 supports an iris recognition function, user authentication may be performed based on iris information obtained using the eye tracking camera 260-1. Another example in which the eye tracking camera 260-1 is disposed toward the user's right eye is illustrated in FIG. 2B, but the embodiment is not limited thereto, and the eye tracking camera 260-1 may be disposed alone toward the user's left eye or may be disposed toward two eyes.

In an embodiment, the photographing camera 260-4 may photograph a real image or background to be matched with a virtual image in order to implement the augmented reality or mixed reality content. The photographing camera 260-4 may photograph an image of a specific object existing at a position viewed by the user and may provide the image to the at least one display 250. The at least one display 250 may, for example, display one image in which a virtual image provided through the at least one optical device 282 and 284 is overlapped with information on the real image or background including an image of the specific object obtained by using the photographing camera. The wearable device 103 may compensate for depth information (e.g., a distance between the wearable device 103 and an external object obtained through a depth sensor), by using an image obtained through the photographing camera 260-4. The wearable device 103 may, for example, perform object recognition through an image obtained using the photographing camera 260-4. While displaying a screen representing a virtual space on the at least one display 250, the wearable device 103 may perform a pass through function for displaying an image obtained through the photographing camera 260-4 overlapping at least a portion of the screen. In an embodiment, the photographing camera may be disposed on the bridge 203 disposed between the first rim 201 and the second rim 202.

The eye tracking camera 260-1 may implement a more realistic augmented reality by matching the user's gaze with the visual information provided on the at least one display 250, by tracking the gaze of the user wearing the wearable device 103. For example, when the user looks at the front, the wearable device 103 may naturally display environment information associated with the user's front on the at least one display 250 at a position where the user is positioned. The eye tracking camera 260-1 may be configured to capture an image of the user's pupil in order to determine the user's gaze. The eye tracking camera 260-1 may receive gaze detection light reflected from the user's pupil and may track the user's gaze based on the position and movement of the received gaze detection light. In another embodiment, the eye tracking camera 260-1 may be disposed at a position corresponding to the user's left and right eyes. For example, the eye tracking camera 260-1 may be disposed in the first rim 201 and/or the second rim 202 to face the direction in which the user wearing the wearable device 103 is positioned.

The motion recognition camera 260-2 and camera 260-3 may provide a specific event to the screen provided on the at least one display 250 by recognizing the movement of the whole or portion of the user's body, such as the user's torso, hand, or face. The motion recognition camera 260-2 and camera 260-3 may, for example, obtain a signal corresponding to motion by recognizing the user's motion (e.g., gesture recognition), and may provide a display corresponding to the signal to the at least one display 250. The wearable device 103 may identify a signal corresponding to the operation and may perform a preset function based on the identification. The motion recognition camera 260-2 and 260-3 may be used to perform simultaneous localization and mapping (SLAM) for 6 degrees of freedom pose (6 dof pose) and/or a space recognition function using a depth map. The wearable device 103 may perform a gesture recognition function and/or an object tracking function, by using the motion recognition cameras 260-2 and 260-3. The motion recognition camera 260-2 and camera 260-3 may be disposed on the first rim 201 and/or the second rim 202.

The camera 260 included in the wearable device 103 is not limited to the above-described eye tracking camera 260-1 and the motion recognition camera 260-2 and 260-3. For example, the wearable device 103 may identify an external object included in the FoV by using a camera disposed toward the user's FoV. That the wearable device 103 identifies the external object may be performed based on a sensor for identifying a distance between the wearable device 103 and the external object, such as a depth sensor and/or a time of flight (ToF) sensor. The camera 260 disposed toward the FoV may support an autofocus function and/or an optical image stabilization (OIS) function. In order to obtain an image including a face of the user wearing the wearable device 103, the wearable device 103 may include the camera 260 (e.g., a face tracking (FT) camera) disposed toward the face.

Although not illustrated, the wearable device 103 according to an embodiment may further include a light source (e.g., light-emitting diode (LED)) that emits light toward a subject (e.g., user's eyes, face, and/or an external object in the FoV) photographed by using the camera 260. The light source may include an LED having an infrared wavelength. The light source may be disposed on at least one of the frame 200, and the hinge units 206 and 207.

The battery module 270 may supply power to electronic components of the wearable device 103. In an embodiment, the battery module 270 may be disposed in the first temple 204 and/or the second temple 205. For example, the battery module 270 may be a plurality of battery modules 270. The plurality of battery modules 270, respectively, may be disposed on each of the first temple 204 and the second temple 205. In another embodiment, the battery module 270 may be disposed at an end of the first temple 204 and/or the second temple 205.

The antenna module 275 may transmit the signal or power to the outside of the wearable device 103 or may receive the signal or power from the outside. In an embodiment, the antenna module 275 may be disposed in the first temple 204 and/or the second temple 205. For example, the antenna module 275 may be disposed close to one surface of the first temple 204 and/or the second temple 205.

A speaker 255 may output a sound signal to the outside of the wearable device 103. A sound output module may be referred to as a speaker. In an embodiment, the speaker 255 may be disposed in the first temple 204 and/or the second temple 205 in order to be disposed adjacent to the ear of the user wearing the wearable device 103. The speaker 255 may include a second speaker 255-2 disposed adjacent to the user's left ear by being disposed in the first temple 204, and a first speaker 255-1 disposed adjacent to the user's right ear by being disposed in the second temple 205.

The light emitting module (not illustrated) may include at least one light emitting element. The light emitting module may emit light of a color corresponding to a specific state or may emit light through an operation corresponding to the specific state in order to visually provide information on a specific state of the wearable device 103 to the user. When the wearable device 103 requires charging, it may emit red light at a constant cycle. In an embodiment, the light emitting module may be disposed on the first rim 201 and/or the second rim 202.

Referring to FIG. 2B, according to an embodiment, the wearable device 103 may include the printed circuit board (PCB) 290. The PCB 290 may be included in at least one of the first temple 204 or the second temple 205. The PCB 290 may, for example, include an interposer disposed between at least two sub PCBs. On the PCB 290, one or more hardware (e.g., hardware illustrated by the blocks described with reference to FIG. 5) included in the wearable device 103 may be disposed. The wearable device 103 may include a flexible PCB (FPCB) for interconnecting the hardware.

According to an embodiment, the wearable device 103 may include at least one of a gyro sensor, a gravity sensor, and/or an acceleration sensor for detecting the posture of the wearable device 103 and/or the posture of a body part (e.g., a head) of the user wearing the wearable device 103. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 103 may identify the user's motion and/or gesture performed to execute or stop a specific function of the wearable device 103 based on the IMU.

Figure 3A:
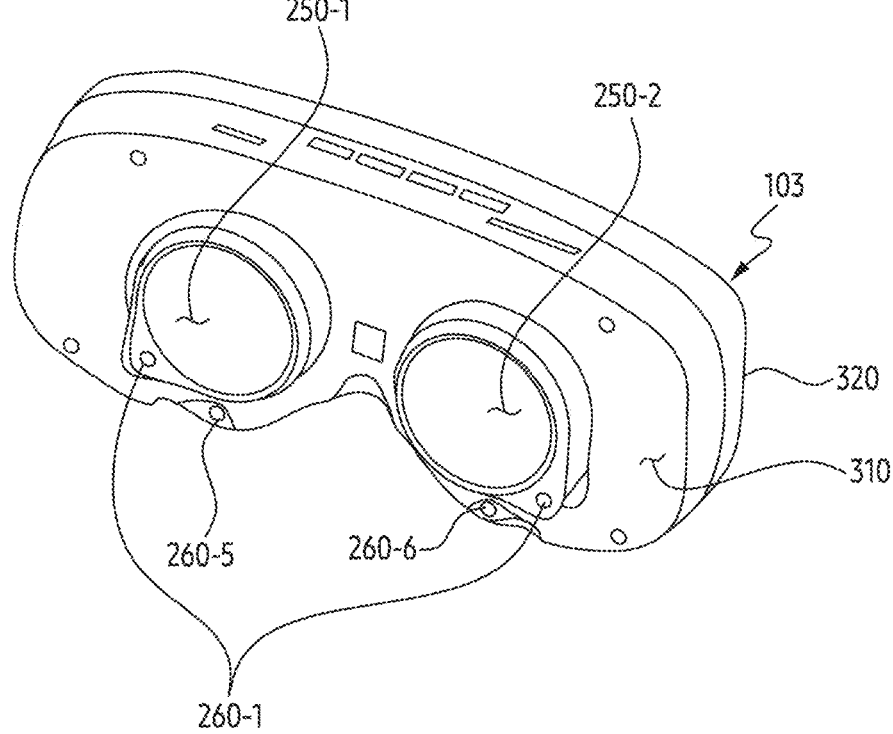
FIGS. 3A and 3B illustrate examples of an exterior of a wearable device, according to various embodiments of the disclosure.
Figure 3B:
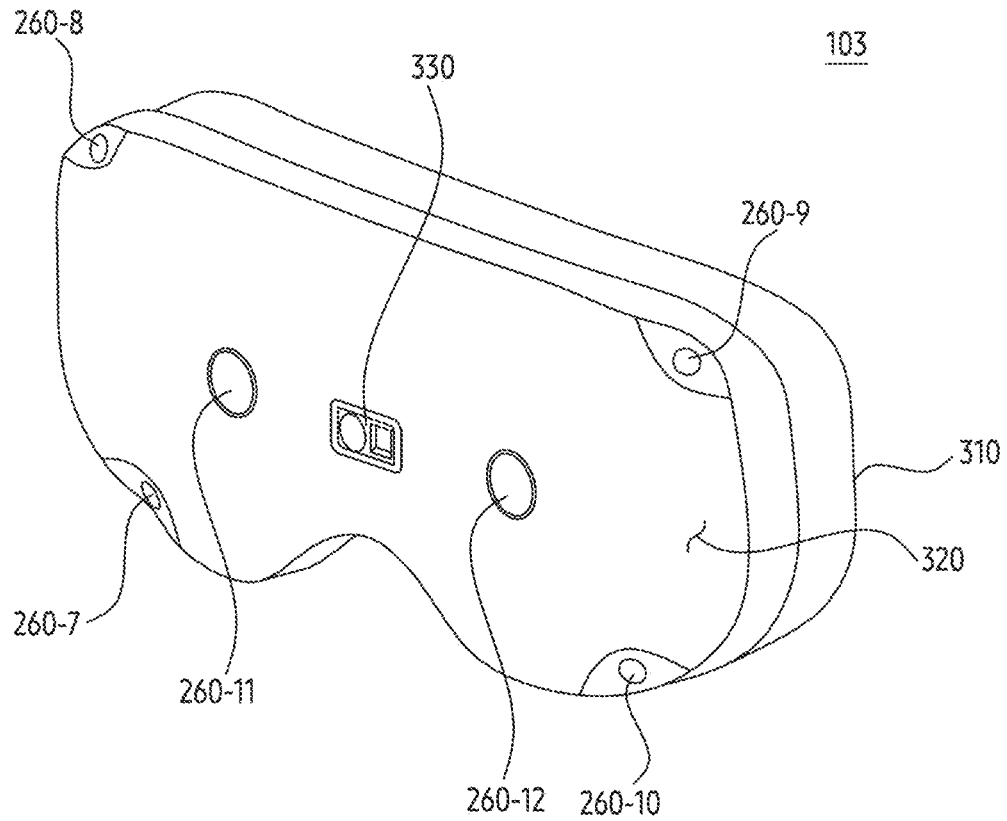

FIGS. 3A and 3B illustrate examples of the exterior of a wearable device according to various embodiments of the disclosure.

A wearable device 103 of FIGS. 3A and 3B may be an example of the electronic device 101 of FIG. 1. According to an embodiment, an example of the exterior of a first surface 310 of a housing of the wearable device 103 may be illustrated in FIG. 3A, and an example of the exterior of a second surface 320 opposite to the first surface 310 may be illustrated in FIG. 3B.

Referring to FIG. 3A, according to an embodiment, a first surface 310 of the wearable device 103 may have an attachable shape on the user's body part (e.g., the user's face). Although not illustrated, the wearable device 103 may further include a strap for being fixed on the user's body part, and/or one or more temples (e.g., the first temple 204 and/or the second temple 205 of FIGS. 2A and 2B). A first display 250-1 for outputting an image to the left eye among the user's two eyes and a second display 250-2 for outputting an image to the right eye among the user's two eyes may be disposed on the first surface 310. The wearable device 103 may further include rubber or silicon packing, which are formed on the first surface 310, for preventing interference by light (e.g., ambient light) different from the light emitted from the first display 250-1 and the second display 250-2.

The wearable device 103 may include cameras 260-1 for photographing and/or tracking two eyes of the user adjacent to each of the first display 250-1 and the second display 250-2. The cameras 260-1 may be referred to as the gaze tracking camera 260-1 of FIG. 2B. According to an embodiment, the wearable device 103 may include cameras 260-5 and 260-6 for photographing and/or recognizing the user's face. The cameras 260-5 and 260-6 may be referred to as a FT camera. The wearable device 103 may control an avatar representing a user in a virtual space, based on a motion of the user's face identified using the cameras 260-5 and 260-6.

Referring to FIG. 3B, a camera (e.g., cameras 260-7, 260-8, 260-9, 260-10, 260-11, and 260-12), and/or a sensor (e.g., the depth sensor 330) for obtaining information associated with the external environment of the wearable device 103 may be disposed on the second surface 320 opposite to the first surface 310 of FIG. 3A. For example, the cameras 260-7, 260-8, 260-9, and 260-10 may be disposed on the second surface 320 in order to recognize an external object.

The cameras 260-7, 260-8, 260-9, and 260-10 may be referred to the motion recognition cameras 260-2 and 260-3 of FIG. 2B.

By using cameras 260-11 and 260-12, the wearable device 103 may obtain an image and/or video to be transmitted to each of the user's two eyes. The camera 260-11 may be disposed on the second surface 320 of the wearable device 103 to obtain an image to be displayed through the second display 250-2 corresponding to the right eye among the two eyes. The camera 260-12 may be disposed on the second surface 320 of the wearable device 103 to obtain an image to be displayed through the first display 250-1 corresponding to the left eye among the two eyes. The cameras 260-11 and 260-12 may be referred to the photographing camera 260-4 of FIG. 2B.

In an embodiment, the wearable device 103 may include the depth sensor 330 disposed on the second surface 320 in order to identify a distance between the wearable device 103 and the external object. By using the depth sensor 330, the wearable device 103 may obtain spatial information (e.g., a depth map) about at least a portion of the FoV of the user wearing the wearable device 103. Although not illustrated, a microphone for obtaining sound outputted from the external object may be disposed on the second surface 320 of the wearable device 103. The number of microphones may be one or more according to embodiments.

The wearable device 103 may recognize a movement of a body part (e.g., a head part) on which the wearable device 103 is worn. For example, the movement of the body part may be recognized based on a value obtained using at least one sensor of the wearable device 103. For another example, the value may include a sensor value representing the movement. Recognizing the movement of the body part may be referred to as head tracking (HeT) technology.

In order to accurately perform the head tracking, the at least one sensor of the wearable device 103 may include a magnetometer, an acceleration sensor, a gyro sensor, or an image sensor (or camera). In an example, the at least one sensor may include an IMU sensor including the magnetometer, the acceleration sensor, and the gyro sensor. A technology for analyzing an image obtained using the image sensor and extracting information (or vision information) within the image may be referred to as a vision technology.

When a movement of vehicles occurs while the user wearing the wearable device 103 boards on the vehicles such as an airplane or a car, a result of tracking information identified through the IMU sensor may be different from a result of tracking information identified through the image sensor. A value (e.g., acceleration information or rotation information) obtained by the at least one sensor may indicate the amount of change according to the movement of the vehicles rather than the amount of change according to the user's movement (or the movement of the wearable device 103). Accordingly, a screen displayed by the wearable device 103 may change differently from the user's intention. The change in the screen that occurs regardless of the user's intention may be referred to as a tracking drift. On the other hand, in case that the user wearing the wearable device 103 walks without the vehicles, even when the user's movement occurs, since the result of the tracking information identified through the IMU sensor is the same as the result of the tracking information identified through the image sensor, the tracking drift may not occur.

In addition, in case that the tracking of the wearable device 103 is corrected by using the sensor information and the vision information of the external electronic device, when the movement of the wearable device 103 and the external electronic device are different from each other, it may be difficult to accurately correct the tracking. According to a difference between a timing at which the sensor information of the external electronic device is obtained and a timing at which the tracking is corrected, accuracy of correction may be reduced. In addition, when continuously receiving the sensor information from the external electronic device, a problem of increased power consumption may occur.

Hereinafter, a device and a method according to embodiments of the disclosure may correct (or improve) the tracking drift, by correcting a value obtained by the wearable device 103 using sensor information of an external electronic device connected to the wearable device 103. The device and method according to the embodiments of the disclosure may reduce the power consumption by obtaining the sensor information satisfying a designated condition from the external electronic device. In case that the external electronic device is a plurality of external electronic devices, according to similarity between movement of each of the plurality of external electronic devices and the movement of the wearable device 103, the device and the method according to the embodiments of the disclosure may determine an application ratio for the correction, and perform the correction by using the determined application ratio. Accordingly, the device and the method according to the embodiments of the disclosure may more accurately perform the correction on the tracking drift and perform tracking (e.g., HeT) on the user's body part.

Figure 4A:
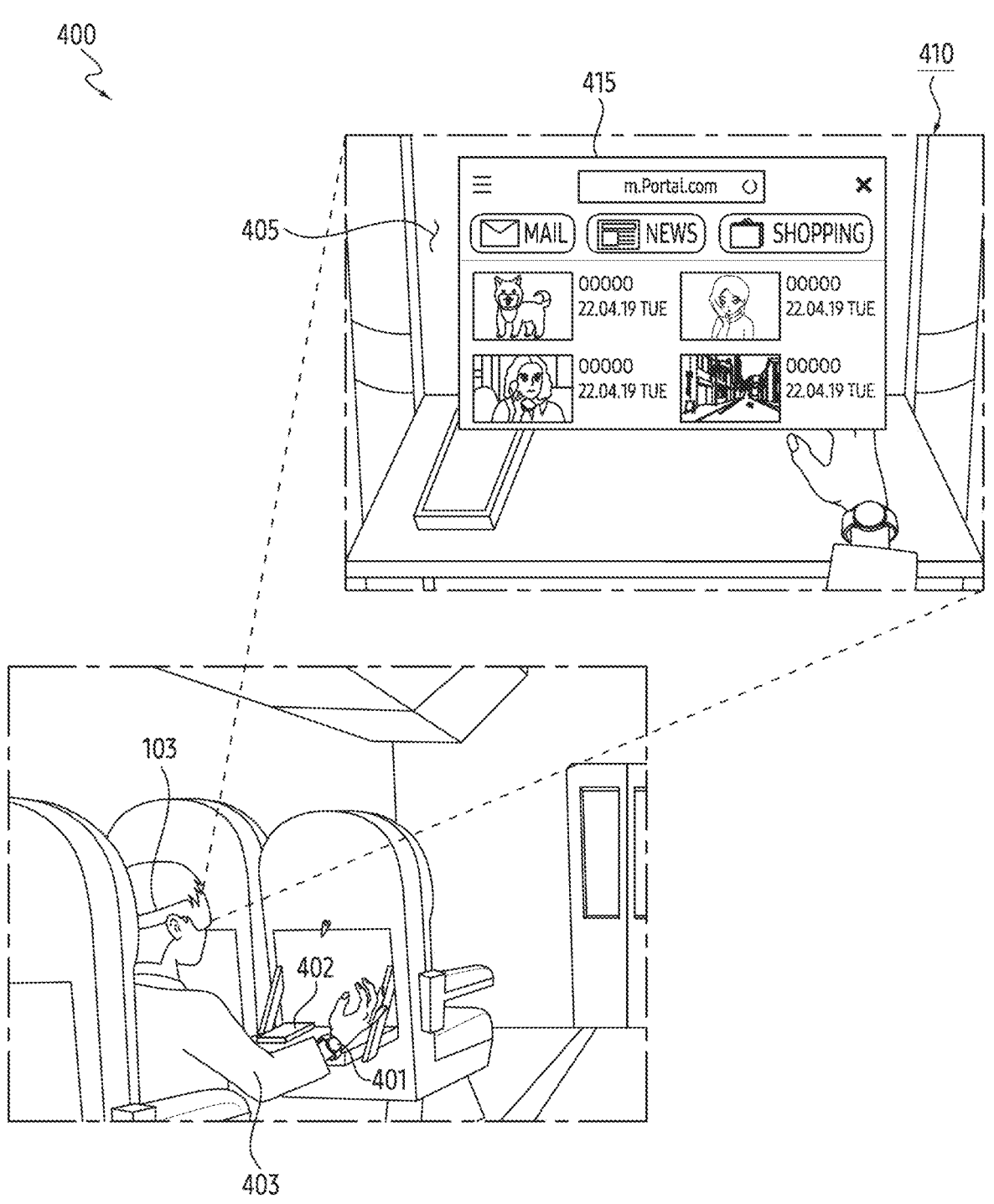
FIGS. 4A and 4B illustrate an example of a method of improving tracking drift using an external electronic device according to various embodiments of the disclosure.
Figure 4B:
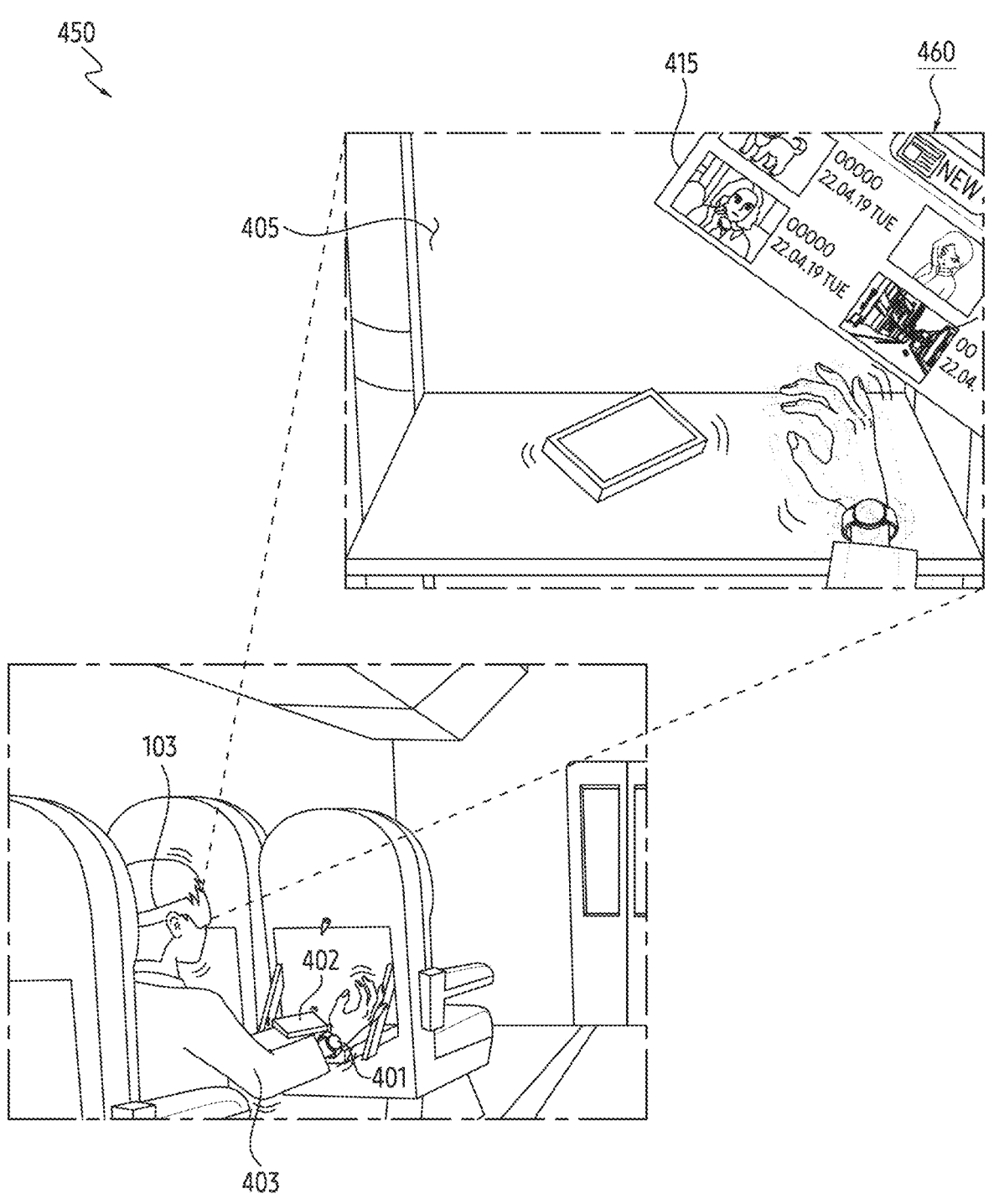

FIGS. 4A and 4B illustrate an example of a method of improving tracking drift using an external electronic device according to various embodiments of the disclosure.

A wearable device 103 of FIGS. 4A and 4B may represent an example of the electronic device 101 of FIG. 1 and the wearable device 103 of FIGS. 2A, 2B, 3A, and 3B. In examples 400 and 450 of FIGS. 4A and 4B, a case in which the wearable device 103 provides an augmented reality (AR) environment is illustrated, but the embodiment of the disclosure is not limited thereto. For example, the wearable device 103 may provide an extended reality (XR) environment including a virtual reality (VR) environment.

Referring to FIGS. 4A and 4B, the examples 400 and 450 illustrate a case in which a user 403 located in vehicles uses the wearable device 103. For example, the vehicles may include an airplane or a car. The wearable device 103 may be worn on a body part of the user 403. For example, the body part of the user 403 may include a head part of the user 403. The wearable device 103 may be connected to a first external electronic device 401 and a second electronic device 402. For another example, the first external electronic device 401 may represent an example of the electronic device 102 of FIG. 1. For example, the second external electronic device 402 may represent an example of the electronic device 104 of FIG. 1. For yet another example, the second external electronic device 402 may be a wearable device worn on another body part of the user 403. For example, the other body part may include a wrist part of the user 403.

The example 400 of FIG. 4A illustrates a case in which the tracking drift according to the movement of the vehicles does not occur. For example, the user 403 may be in a state on which the wearable device 103 and the first external electronic device 401 are worn. The second external electronic device 402 may be located on an external object. For example, the second external electronic device 402 is not worn by the user 403 and may not be affected by the movement of the user 403. The movement (or change of position and posture) of the second external electronic device 402 may be caused by an external factor rather than the user 403. For example, the external object may include a shelf in the vehicles. Referring to the example 400, the wearable device 103 may provide XR environment 405 through a screen 410. The user 403 may use a service through the XR environment 405 by using the wearable device 103. For example, the wearable device 103 may display a virtual object 415 on the screen 410. For example, the virtual object 415 may be located in a partial area (e.g., center) of the screen 410. For example, the virtual object 415 may include a web site. However, the embodiment of the disclosure is not limited thereto.

The example 450 of FIG. 4B illustrates a case in which the tracking drift according to the movement of the vehicles occurs. When the movement of the vehicles is rapidly changed, the tracking drift may occur. For example, according to the movement of the vehicles, the wearable device 103, the first external electronic device 401, and the second external electronic device 402 may move. For another example, the wearable device 103 and the first external electronic device 401 may be shaken while being worn on the body part of the user 403. For example, a position of the second external electronic device 402 on the external object may be changed. In this case, a position of the virtual object 415 may be changed according to the movement of the vehicles on the screen 460 provided through the wearable device 103. For still another example, according to the tracking drift generated in the wearable device 103, the virtual object 415 may be located in another partial area (e.g., right) within the screen 460. A change from the partial area of the screen 410 to the other partial area of the screen 460 may be caused by the tracking drift. In other words, the wearable device 103 may recognize the movement of the vehicles as the movement of the user 403, and display the virtual object 415 in the other partial area changed based on the movement of the user 403.

The wearable device 103 may receive sensor information from at least one of the first external electronic device 401 and the second external electronic device 402. For example, the wearable device 103 may receive first sensor information obtained through at least one sensor of the first external electronic device 401 from the first external electronic device 401. For example, the first sensor information may include a first sensor value representing a movement of the first external electronic device 401 and time information at which the first sensor value is obtained. For example, the wearable device 103 may receive second sensor information obtained through at least one sensor of the second external electronic device 402 from the second external electronic device 402. For example, the second sensor information may include a second sensor value representing a movement of the second external electronic device 402 and time information at which the second sensor value is obtained. In the examples of FIGS. 4A and 4B, the wearable device 103 may be in a state of being connected to each of the first external electronic device 401 and the second external electronic device 402, and may receive the sensor information from each of the first external electronic device 401 and the second external electronic device 402. However, the embodiment of the disclosure is not limited thereto. For example, the wearable device 103 may receive the first sensor information and the second sensor information together from the second external electronic device 402. The first external electronic device 401 may be connected to the second external electronic device 402. Specific details related to this are described in FIG. 8 below.

According to an embodiment, the wearable device 103 may obtain a value representing a movement of the wearable device 103 through at least one sensor of the wearable device 103. The value representing the movement of the wearable device 103 may indicate a sensor value obtained through the at least one sensor. For example, the wearable device 103 may obtain the value representing the movement at timing.

In an embodiment, the wearable device 103 may obtain a value representing a movement of an external electronic device that is expected (or predicted) at the timing, by using time information included in sensor information obtained from the external electronic device. For example, the wearable device 103 may obtain a first value representing a movement of the first external electronic device 401 expected at the timing, by using the time information of the first sensor information obtained from the first external electronic device 401. In addition, for example, the wearable device 103 may obtain a second value representing a movement of the second external electronic device 402 expected at the timing, by using the time information of the second sensor information obtained from the second external electronic device 402. Specific details related to this are described in FIGS. 6 and 7A below.

According to another embodiment, the wearable device 103 may evaluate a similarity between the movement of the external electronic device and the movement of the wearable device 103. For example, the wearable device 103 may compare the value representing the movement of the wearable device 103 with the first value representing the movement of the first external electronic device 401 at the timing. The wearable device 103 may obtain a first similarity value between the first value and the value. In addition, for example, the wearable device 103 may compare the value indicating the movement of the wearable device 103 with the second value indicating the movement of the second external electronic device 402 at the timing. Accordingly, the wearable device 103 may obtain a second similarity value between the second value and the value. Specific details related to this are described in FIGS. 6 and 7B below.

According to still another embodiment, the wearable device 103 may determine a ratio to be applied to adjustment (or correction, compensation) of the value, based on the obtained similarity value and a reference value. For example, the ratio may be referred to as an application ratio. For example, the wearable device 103 may determine to use the first value to adjust the value based on the first similarity value greater than the reference value. For another example, the wearable device 103 may determine not to use the second value to adjust the value, based on the second similarity value less than the reference value. Accordingly, the wearable device 103 may perform adjustment of the value by using the first value. In other words, in the example, an application ratio of the first value may be 1, and an application ratio of the second value may be 0.

An example in which the adjustment of the value using some values (e.g., the first value) is performed according to the comparison between the reference value and the first value or the second value is described, but the embodiment of the disclosure is not limited thereto. For example, when the second similarity value is greater than the reference value and the second similarity value is greater than the first similarity value, the wearable device 103 may use the first value and the second value to adjust the value. In this case, in the adjustment, the application ratio of the second value may be greater than the application ratio of the first value. When the application ratio of the first value is a first weight (or a first weight value), and the application ratio of the second value is a second weight (or a second weight value), the second weight (e.g., 0.7) may be greater than the first weight (e.g., 0.3). The second weight may be determined based on a difference between the reference value and the second similarity value, and the first weight may be determined based on a difference between the reference value and the first similarity value. Specific details related to this are described in FIGS. 6 and 7C below.

As described above, the wearable device 103 may correct the tracking drift by adjusting the value representing the movement of the wearable device 103 using sensor information obtained from an external electronic device. Even when the vehicles move as in the example 450, the wearable device 103 may display the screen 410 based on the adjustment, instead of the screen 460. Even when a change in an external environment occurs such as the movement of the vehicles, the wearable device 103 may display a screen such as the screen 410 in which there is no change in the external environment, instead of the screen 460 to be displayed when there is no correction, by correcting the tracking drift using the external electronic device. The wearable device 103 may reduce the influence of the adjustment according to an external factor unrelated to the intention of the user 403. Accordingly, the wearable device 103 may provide a more stable user experience to the user 403.

Referring to the described above, examples 400 and 450 of a case in which the tracking drift occurs according to the movement of the vehicles when the user 403 wearing the wearable device 103 boards the vehicles are illustrated, but the embodiment of the disclosure is not limited thereto. For example, it may be applied even when the user 403 does not board the vehicles. For example, the embodiments of the disclosure may also be applied to the tracking drift generated by a malfunction of the sensor of the wearable device 103.

Figure 5:
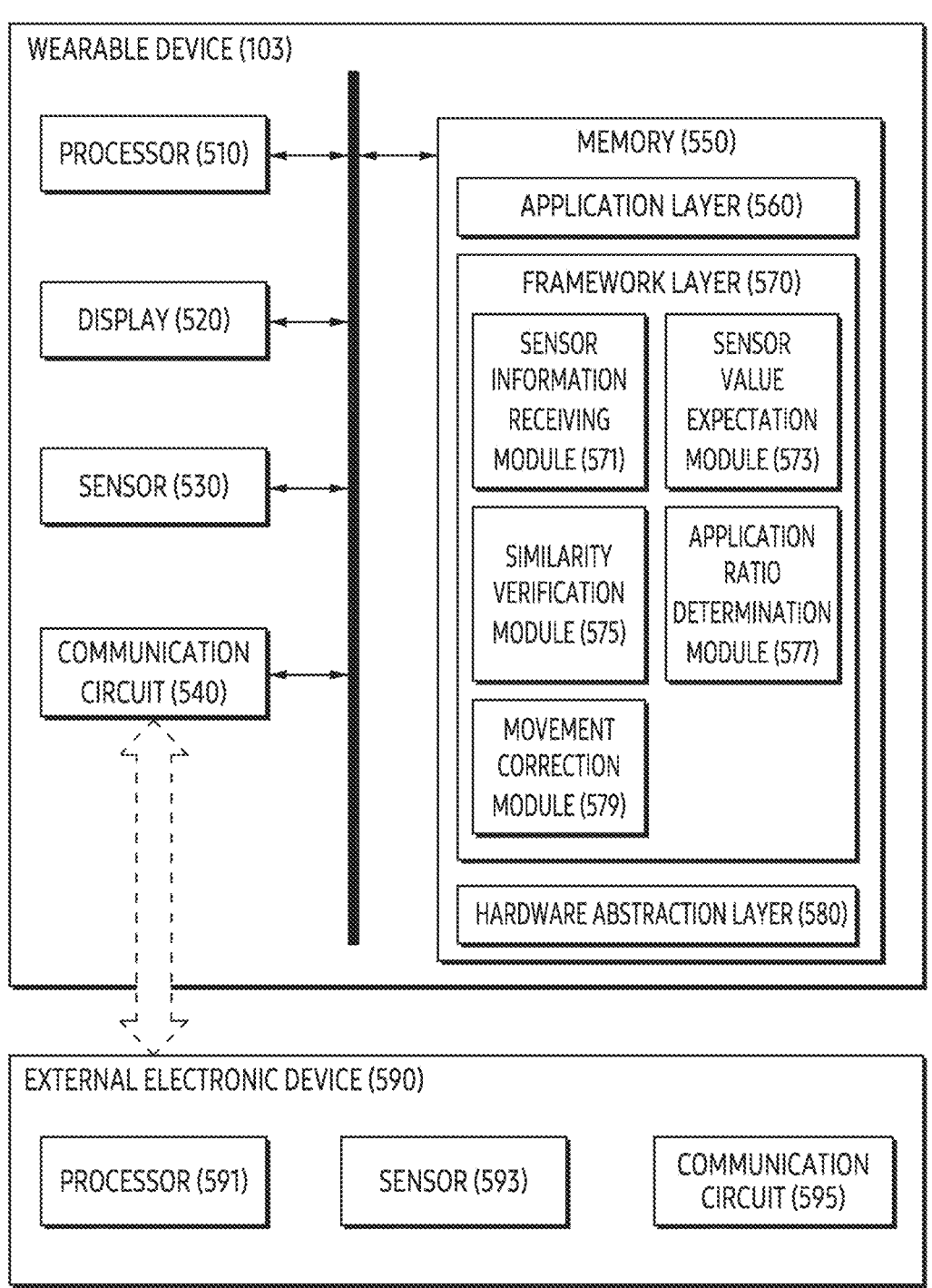
FIG. 5 illustrates a block diagram of a wearable device according to an embodiment of the disclosure.

FIG. 5 illustrates a block diagram of a wearable device according to an embodiment of the disclosure.

A wearable device 103 of FIG. 5 may be an example of the electronic device 101 of FIG. 1, the wearable device 103 of FIGS. 2A, 2B, 3A, and 3B, or the wearable device 103 of FIGS. 4A and 4B. An external electronic device 590 of FIG. 5 may be an example of the first external electronic device 401 or the second external electronic device 402 of FIGS. 4A and 4B.

Referring to FIG. 5, a situation in which the wearable device 103 and the external electronic device 590 are connected to each other based on a wired network and/or a wireless network is illustrated. For example, the wired network may include a network such as Internet, local area network (LAN), wide area network (WAN), or a combination thereof. The wireless network may include a network such as long term evolution (LTE), 5g new radio (NR), wireless fidelity (Wi-Fi), Zigbee, near field communication (NFC), Bluetooth, Bluetooth low energy (BLE), or a combination thereof. Although the wearable device 103 and the external electronic device 590 are illustrated to be directly connected, the wearable device 103 and the external electronic device 590 may be indirectly connected through one or more routers and/or access points (AP).

Referring to FIG. 5, according to an embodiment, the wearable device 103 may include at least one of a processor 510, a display 520, a sensor 530, a communication circuit 540, or memory 550. The processor 510, the display 520, the sensor 530, the communication circuit 540, and the memory 550 may be electronically and/or operably coupled with each other by a communication bus. The operational coupling of the hardware components may mean that a direct connection or an indirect connection between the hardware components is established by wire or wirelessly so that the second hardware component is controlled by the first hardware component among the hardware components. Although illustrated based on different blocks, the embodiment is not limited thereto, and a portion (e.g., at least a portion of the processor 510, the memory 550, and the communication circuit 540) of the hardware components illustrated in FIG. 5 may be included in a single integrated circuit such as a system on chip (SoC). The type and/or number of hardware components included in the wearable device 103 is not limited to those illustrated in FIG. 5. For example, the wearable device 103 may include only a portion of the hardware components illustrated in FIG. 5.

The processor 510 of the wearable device 103 may include various processing circuits and/or a plurality of processors. For example, the term "processor" used in this document, including the claim, may include various processing circuits containing at least one processor, and one or more of the at least one processor may be configured to individually and/or collectively perform various functions described below in a distributed scheme. When "processor", "at least one processor", and "one or more processors" are described as being configured to perform various functions as used below, these terms are not limited to the example, and include situations in which one processor performs a part of quoted functions and another processor(s) performs another part of the quoted functions, and also situations in which one processor may perform all of the quoted functions. Additionally, for example, the at least one processor may include a combination of processors that perform various functions listed/disclosed in a distributed scheme. The at least one processor may execute program instructions to achieve or perform various functions.

According to another embodiment, the processor 510 of the wearable device 103 may include a hardware component for processing data based on one or more instructions. For example, the hardware component for processing data may include an arithmetic and logic unit (ALU), a floating point unit (FPU), and a field programmable gate array (FPGA). For example, the hardware component for processing data may include a central processing unit (CPU), a graphics processing unit (GPU), a digital signal processing unit (DSP), and/or a neural processing unit (NPU). The number of processors 510 may be one or more. For example, the processor 510 may have a structure of a multi-core processor such as a dual core, a quad core, or a hexa core. The processor 510 of FIG. 5 may include the processor 120 of FIG. 1.

According to yet another embodiment, the display 520 of the wearable device 103 may output visualized information to the user. The number of the displays 520 included in the wearable device 103 may be one or more. For example, the display 520 may be controlled by the processor 510 and/or a graphic processing unit (GPU) (not illustrated) to output visualized information to the user. The display 520 may, for example, include a flat panel display (FPD) and/or an electronic paper. The FPD may include a liquid crystal display (LCD), a plasma display panel (PDP), a digital mirror device (DMD), one or more light emitting diodes (LEDs), and/or a micro LED. The LED may include an organic LED (OLED). The display 520 of FIG. 5 may include the display module 160 of FIG. 1. For example, the display 520 of FIG. 5 may display a visual object illustrated in FIG. 9.

The wearable device 103 may include a sensor 530. For example, the sensor 530 may include at least one sensor for measuring a movement of the wearable device 103. For example, the sensor may include an IMU (or IMU sensor). The sensor may include a magnetometer, a gyro sensor, a gravity sensor, and/or an acceleration sensor. The sensor may include at least a portion of the sensor module 176 of FIG. 1.

In an embodiment, the communication circuit 540 of the wearable device 103 may include hardware for supporting transmission and/or reception of an electrical signal between the wearable device 103 and the external electronic device 590. For example, the communication circuit 540 may include at least one of a MODEM, an antenna, and an optic/electronic (O/E) converter. The communication circuit 540 may support the transmission and/or reception of the electrical signal, based on various types of communication means such as Ethernet, Bluetooth, Bluetooth low energy (BLE), ZigBee, long term evolution (LTE), and 5G new radio (NR). The communication circuit 540 of FIG. 5 may include the communication module 190 of FIG. 1 and/or the antenna module 197.

In another embodiment, the memory 550 of the wearable device 103 may include a hardware component for storing data and/or instructions inputted to the processor 510 or outputted from the processor 510. For example, the memory 550 may include a volatile memory such as random-access memory (RAM) and/or a non-volatile memory such as read-only memory (ROM). For example, the volatile memory may include at least one of dynamic RAM (DRAM), static RAM (SRAM), Cache RAM, and pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disk, and an embedded multimedia card (eMMC). The memory 550 of FIG. 5 may include the memory 130 of FIG. 1.

Although not illustrated in FIG. 5, the wearable device 103 may include a camera. The camera may include one or more optical sensors (e.g., a charged coupled device (CCD) sensor, a complementary metal oxide semiconductor (CMOS) sensor) that generate an electrical signal indicating the color and/or brightness of light. For example, the camera may be referred to as an image sensor. A plurality of optical sensors included in the camera may be arranged in the form of a 2-dimensional array. The camera may correspond to light that reaches light sensors of the 2-dimensional array by substantially simultaneously obtaining an electrical signal of each of the plurality of optical sensors, and generate an image including a plurality of pixels arranged in 2-dimensions. The wearable device 103 may render an actual environment within the image from the image obtained through the camera, and display the rendered visual information. The number of cameras included in the wearable device 103 may be one or more, as described above with reference to FIGS. 2A and 2B, and/or FIGS. 3A and 3B.

Although not illustrated in FIG. 5, according to an embodiment, the wearable device 103 may include an output means for outputting information in a form other than a form in which information is visualized. For example, the wearable device 103 may include a speaker for outputting an acoustic signal. For another example, the wearable device 103 may include a motor for providing haptic feedback based on vibration.

Referring to FIG. 5, according to an embodiment, one or more instructions (or commands) indicating calculations and/or operations to be performed by the processor 510 of the wearable device 103 on data may be stored in the memory 550 of the wearable device 103. A set of one or more instructions may be referred to as a program, firmware, operating system, process, routine, sub-routine, and/or application. Hereinafter, that an application is installed in an electronic device (e.g., the wearable device 103) may be that one or more instructions provided in the form of the application are stored in the memory 550, and mean that the one or more applications are stored in a format (e.g., a file with an extension designated by the operating system of the wearable device 103) executable by a processor of the electronic device. The wearable device 103 may execute one or more instructions stored in the memory 550 to perform operations of FIGS. 6 and 10.

Referring to FIG. 5, programs installed in the wearable device 103 may be classified into any one of different layers including an application layer 560, a framework layer 570, and/or a hardware abstraction layer (HAL) 580, based on a target. For example, programs (e.g., drivers) designed to target a hardware (e.g., the display 520, and/or the communication circuitry 540) of the wearable device 103 may be classified into the hardware abstraction layer 580. Programs (e.g., a sensor information receiving module 571, a sensor value expectation module 573, a similarity verification module 575, an application ratio determination module 577, and/or a movement correction module 579) designed to target at least one of the hardware abstraction layer 580 and/or the application layer 560 may be classified into the framework layer 570. The programs classified into the framework layer 570 may provide an application programming interface (API) executable based on another program.

Referring to FIG. 5, a program designed to target a user controlling the wearable device 103 may be classified into the application layer 560. For example, the program classified into the application layer 560 may include at least one of applications providing an XR environment. The embodiment of the disclosure is not limited thereto. For example, a program classified into the application layer 560 may cause execution of a function supported by programs classified into the framework layer 570, by calling the API.

Referring to FIG. 5, the wearable device 103 may receive sensor information from the external electronic device 590, based on execution of the sensor information receiving module 571 in the framework layer 570. For example, when a designated condition is satisfied, the wearable device 103 may request the sensor information from the external electronic device 590. For another example, the designated condition may include a case in which an error between vision information and a value representing a movement of the wearable device 103 obtained using the sensor 530 occurs longer than or equal to a designated time length. The error may cause tracking drift. The designated condition may include a case in which the movement of the wearable device 103 recognized based on the value of the sensor 530 is identified as an abnormal movement. The abnormal movement may include a case in which the movement of the wearable device 103 recognized based on the value is not continuous. Alternatively, for example, the designated condition may include a case in which an acceleration of the movement recognized based on the value of the sensor 530 is linearly changed. The designated condition may include a case in which the wearable device 103 (or a user wearing the wearable device 103) is located within vehicles. For example, being located within the vehicles may be recognized based on the wearable device 103 detecting vibration according to an external factor. Referring to the described above, when the designated condition is satisfied, the wearable device 103 may request the sensor information from the external electronic device 590. For example, the sensor information may include a sensor value obtained through a sensor 593 of the external electronic device 590 and time information. For example, the sensor value may include an acceleration sensor value or a gyro sensor value. For example, the time information may include a timing (e.g., a timestamp) at which the sensor value is obtained. The wearable device 103 and the external electronic device 590 may be synchronized with each other. When requesting the sensor information, the wearable device 103 may indicate an update period of the sensor information to be transmitted by the external electronic device 590. The update period may include a designated time interval (e.g., minutes, seconds) or a designated number of times. Alternatively, for example, the wearable device 103 may indicate an end time (timing) together with the update period. For example, the update period may be indicated for each sensor value. For example, when the amount of change in the acceleration of the wearable device 103 is large, the wearable device 103 may indicate a relatively short update period with respect to the acceleration sensor value to the external electronic device 590. When the amount of change in rotation information (or a value of the gyro sensor) of the wearable device 103 is small, the wearable device 103 may indicate a relatively long update period with respect to the gyro sensor value to the external electronic device 590.

According to an embodiment, the external electronic device 590 may transmit the sensor information to the wearable device 103, based on a comparison between the obtained sensor information and the previous sensor information. For example, the external electronic device 590 may compare a reference difference with a difference between the sensor information obtained using the sensor 593 in a first period and other sensor information obtained using the sensor 593 in a second period before the first period. In this case, the other sensor information of the second period may be stored in memory (not illustrated) of the external electronic device 590. In this case, the difference may include a difference $$\left(\sqrt{(x_2 - x_1)^2 + \cdots + (z_2 - z_1)^2}\right)$$

between a vector (e.g., (x1, y1, z1)) representing a sensor value of the sensor information and another vector (e.g., (x2, y2, z2)) representing a sensor value of the other sensor information. Alternatively, for example, the difference may include a difference between a value of at least some axis (e.g., x-axis, y-axis, or z-axis) of the vector and a value of the at least some axis of the other vector. Alternatively, when the value of the at least some axis (e.g., x-axis, y-axis, or z-axis) of the vector is a value outside a designated range, the external electronic device 590 may transmit the sensor information to the wearable device 103.

The sensor value included in the sensor information may be a text format or a binary format. For example, the text format may include Plain, JSON, and XML. For example, the binary format may include Protobuf. When a connection state between the wearable device 103 and the external electronic device 590 is poor (e.g., detection of a data delay), data including the sensor value may be compressed and transmitted. In the described above example, a compression transmission scheme of the data used when the connection state between the wearable device 103 and the external electronic device 590 is poor is described, but the embodiment of the disclosure is not limited thereto. For example, the data transmitted and received between the wearable device 103 and the external electronic device 590 may be compressed and transmitted regardless of the connection state.

By transmitting and receiving the sensor information based on the comparison between the difference and the reference difference and/or the update period indicated by the wearable device 103, power consumption of the wearable device 103 and the external electronic device 590 may be reduced.

According to another embodiment, the wearable device 103 may receive (or obtain) the sensor information from the external electronic device 590 identified according to priority, based on execution of the sensor information receiving module 571. For example, the priority may represent an order between one or more external electronic devices to request and receive the sensor information. According to still another embodiment, the priority may be determined by a user's input. For example, the wearable device 103 may set the priority between the one or more external electronic devices according to a state (e.g., walking or boarding vehicles) of the user, based on the user's input. For example, the wearable device 103 may request the sensor information from an external electronic device having the highest priority among the one or more external electronic devices, and receive the sensor information in response to the request. The priority may be determined based on record information. For example, the wearable device 103 may determine the priority, by using the record information including similarity values with respect to movement between the wearable device 103 and the one or more external electronic devices. For example, the record information may include the similarity values before a current time point. The priority may be determined according to a connection order between the one or more external electronic devices. For example, the wearable device 103 may determine the priority corresponding to an order in which each of the one or more external electronic devices and the wearable device 103 are connected.

Referring to FIG. 5, the wearable device 103 may expect a sensor value at a designated timing, based on execution of the sensor value expectation module 573 in the framework layer 570. The sensor value may be, for example, calculated based on sensor information obtained from the external electronic device 590 and represent a movement of the external electronic device 590 expected at the designated timing. The expectation may be to compensate for an error between a timing at which the external electronic device 590 obtains the sensor information and a timing at which the wearable device 103 obtains the value. The error may include a time delay while the sensor information is transmitted from the external electronic device 590 to the wearable device 103, or a time delay while the wearable device 103 obtains the value.

For example, the designated timing may indicate a timing at which the wearable device 103 obtains a value representing a movement of the wearable device 103 using the sensor 530. The wearable device 103 may expect the sensor value at the designated timing, by using the sensor information obtained in the first period and the other sensor information obtained and stored in the second period before the first period. The designated timing may be included in the first period. For example, the expected sensor value may be obtained (or calculated) using an operation algorithm or a statistical model (e.g., artificial intelligence (AI) model, machine learning, and deep learning). Specific details related to this are described in FIGS. 6 and 7A below.

Referring to FIG. 5, the wearable device 103 may check similarity between a movement of the external electronic device 590 and a movement of the wearable device 103, based on execution of the similarity verification module 575 in the framework layer 570. The wearable device 103 may calculate a similarity value indicating similarity between the value obtained at the designated timing and the expected sensor value. The similarity value may be obtained (or calculated) using the operation algorithm or the statistical model. For example, the operation algorithm may include a difference between a vector according to the value and a vector according to the expected sensor value, or a cosine value between the vectors. Specific details related to this are described in FIGS. 6 and 7B below.

Referring to FIG. 5, based on execution of the application ratio determination module 577 in the framework layer 570, the wearable device 103 may determine whether to apply sensor information of the external electronic device 590 (or application ratio) based on the similarity value. For example, the wearable device 103 may determine whether to apply or the application ratio of the sensor information of the external electronic device 590, based on a comparison between the similarity value and a reference value. When the similarity value is less than or equal to the reference value, the wearable device 103 may determine not to use the sensor information, in order to adjust (or correct, compensate) the value. Alternatively, for example, when the similarity value is greater than the reference value, the wearable device 103 may determine to use the sensor information, in order to adjust (or correct, compensate) the value. When the first similarity value is greater than the reference value and the second similarity value is greater than the reference value, the wearable device 103 may determine to use first sensor information related to the first similarity value and second sensor information related to the second similarity value to adjust (or correct, compensate) the value. When the first sensor information and the second sensor information are used, an application ratio between the first sensor information and the second sensor information may be determined based on a first difference between the first similarity value and the reference value and a second difference between the second similarity value and the reference value. For example, when the first difference is greater than the second difference, an application ratio (or a first weight) of the first sensor information may be greater than an application ratio (or a second weight) of the second sensor information.

Referring to FIG. 5, the wearable device 103 may adjust the value based on the application ratio, based on execution of the movement correction module 579 in the framework layer 570. For example, the wearable device 103 may perform an offset (or compensation, cancellation) between the expected sensor value of the sensor information and the value. The wearable device 103 may correct the movement of the wearable device 103, based on information (e.g., the expected sensor value) representing the movement of the external electronic device 590. Specific details related to this will be described in FIGS. 6 and 7C below. Tracking drift generated with respect to the wearable device 103 may be deleted or reduced.

In an embodiment, the wearable device 103 may display a screen according to the correction of the movement of the wearable device 103. For example, the screen may be displayed in a state in which the tracking drift is corrected, like as the screen 410 of FIG. 4A, unlike the screen 460 of FIG. 4B.

The external electronic device 590 of FIG. 5 may include a processor 591, a sensor 593, and a communication circuit

595. For example, the external electronic device 590 may be directly connected to the wearable device 103 using the communication circuit 595. The external electronic device 590 may be indirectly connected to the wearable device 103 through a server (not illustrated), using the communication circuit 595. The content for the communication circuit 595 may be substantially the same as the content for the communication circuit 540. The content for the processor 591 may be substantially the same as the content for the processor 510. The content of the sensor 593 may be substantially the same as the content of the sensor 530. Although not illustrated in FIG. 5, the external electronic device 590 may further include at least one of a display, a camera, and memory.

FIG. 5 illustrates an example in which one external electronic device 590 and the wearable device 103 are connected, but the embodiment of the disclosure is not limited thereto. For example, the wearable device 103 may be connected to a plurality of external electronic devices including the external electronic device 590 and another external electronic device. The wearable device 103 may use sensor information of the plurality of external electronic devices to correct the tracking drift. The wearable device 103 may use sensor information of the external electronic device 590 and the other external electronic device connected to the external electronic device 590, in order to correct the tracking drift. In this case, the other external electronic device may be connected to the external electronic device 590 but may not be connected to the wearable device 103.

Figure 6:
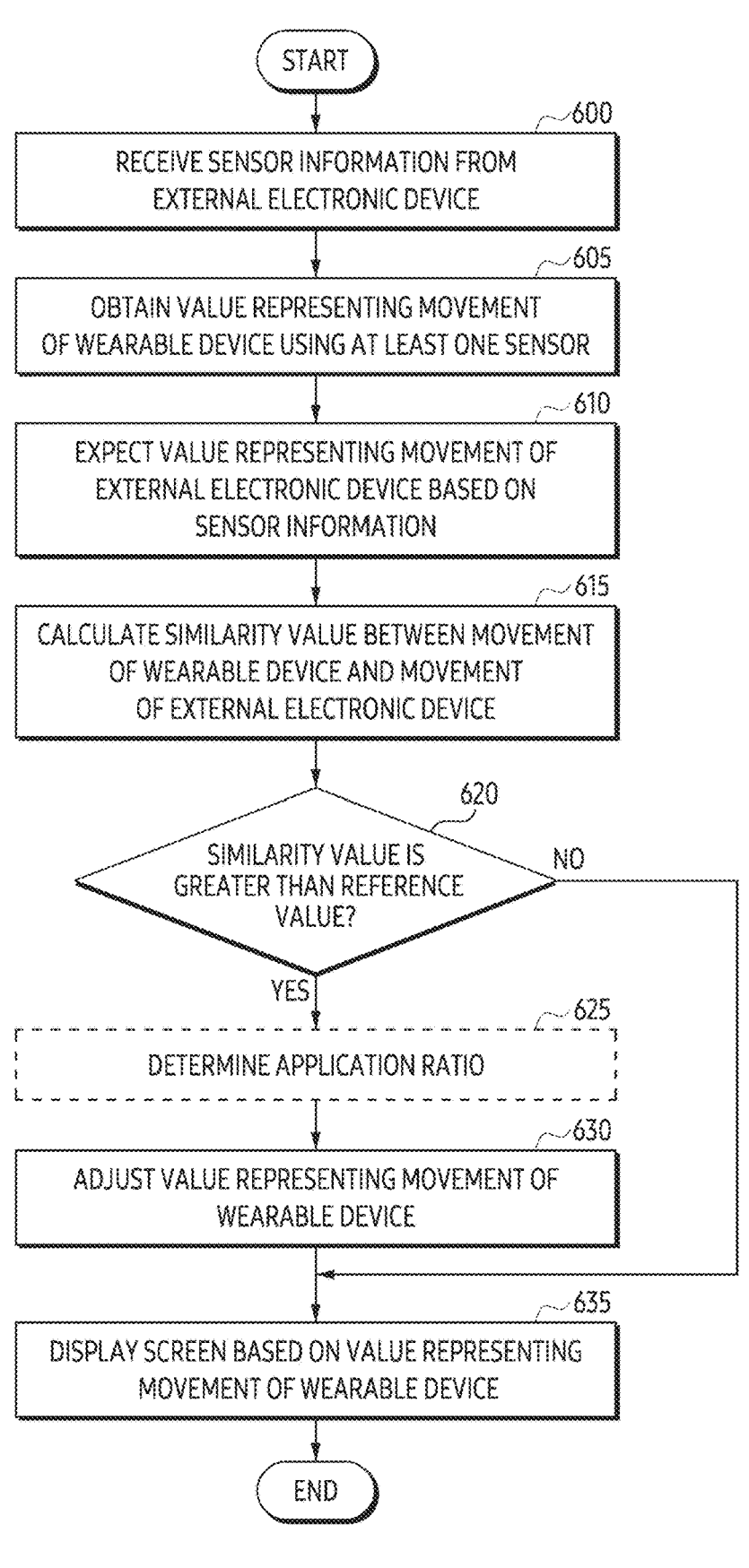
FIG. 6 illustrates an example of an operation flow of a method of adjusting a value representing a movement of a wearable device using sensor information obtained from an external electronic device according to an embodiment of the disclosure.

FIG. 6 illustrates an example of an operation flow of a method of adjusting a value representing a movement of a wearable device using sensor information obtained from an external electronic device according to an embodiment of the disclosure.

Figure 7A:
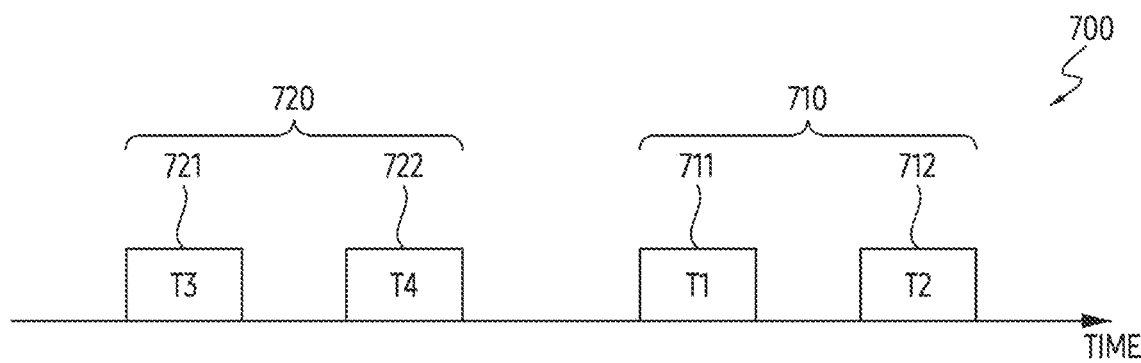
FIG. 7A illustrates an example of a method of expecting a value representing a movement of an external electronic device using sensor information obtained from the external electronic device according to an embodiment of the disclosure.
Figure 7B:
FIG. 7B illustrates an example of a method of calculating a similarity value between a movement of a wearable device and a movement of an external electronic device according to an embodiment of the disclosure.
Figure 7B:
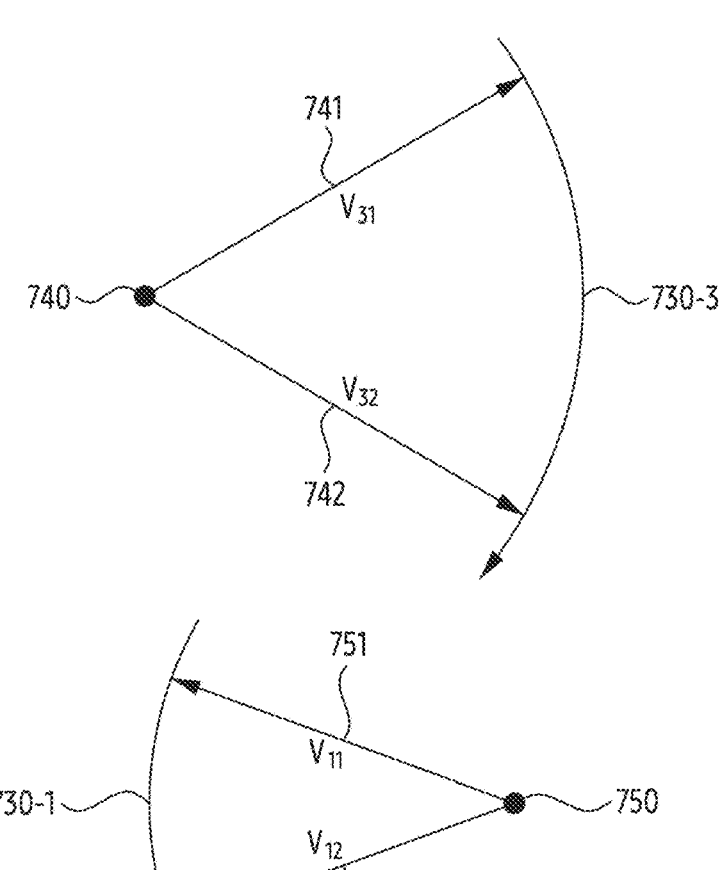
Figure 7B:
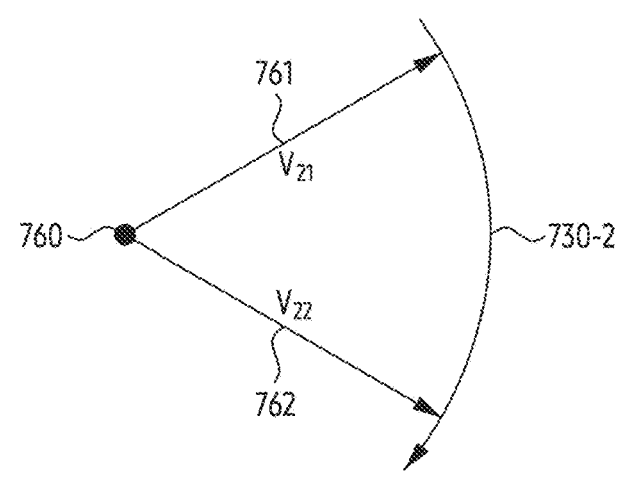
Figure 7C:
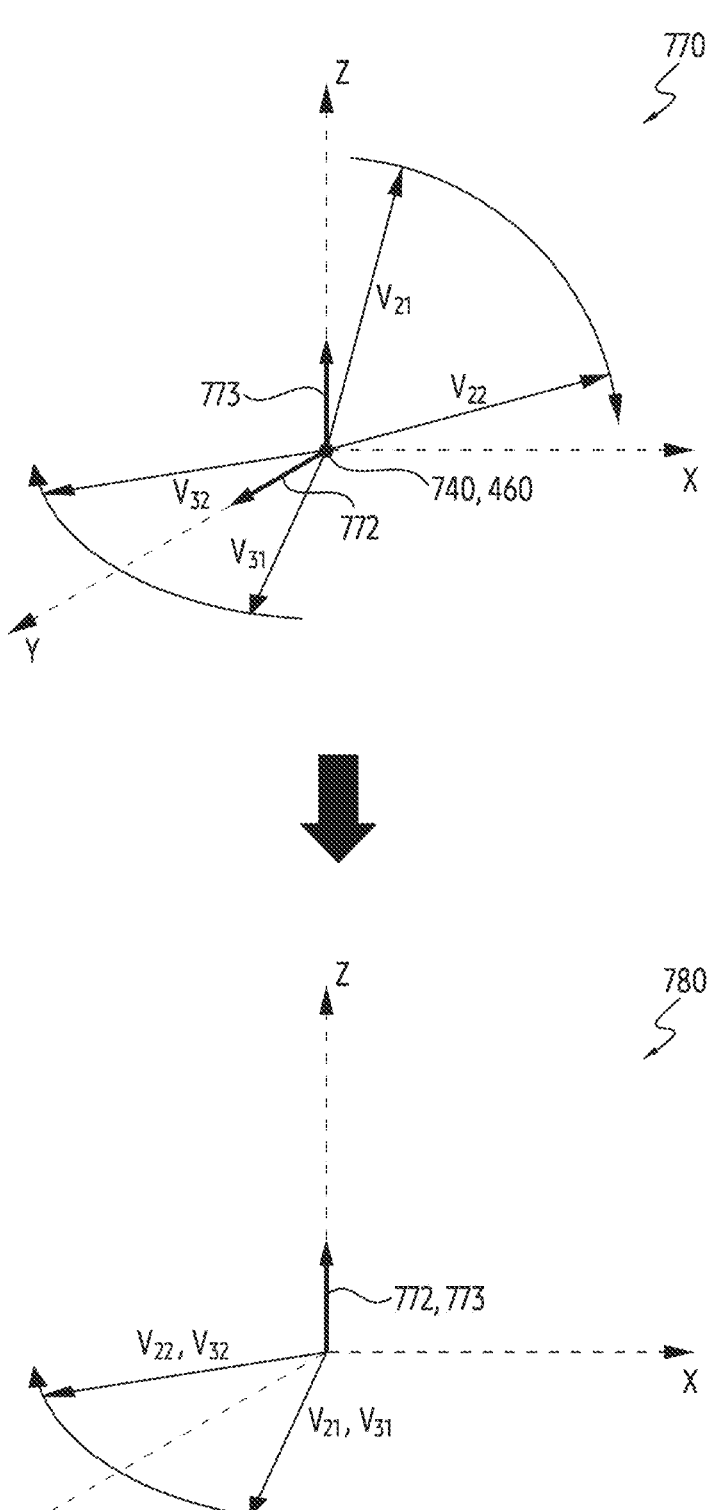
FIG. 7C illustrates an example of a method of adjusting a value representing a movement of a wearable device according to an embodiment of the disclosure.

FIG. 7A illustrates an example of a method of expecting a value representing a movement of an external electronic device using sensor information obtained from the external electronic device according to an embodiment of the disclosure. FIG. 7B illustrates an example of a method of calculating a similarity value between a movement of a wearable device and a movement of an external electronic device according to an embodiment of the disclosure. FIG. 7C illustrates an example of a method of adjusting a value representing a movement of a wearable device according to an embodiment of the disclosure.

At least a portion of the methods of FIG. 6 may be performed by the wearable device 103 of FIG. 5. For example, at least a portion of the methods may be controlled by the processor 510 of the wearable device 103. In the following embodiment, each operation may be performed sequentially, but is not necessarily performed sequentially. For example, the sequence of each operation may be changed, and at least two operations may be performed in parallel.

In operation 600, a wearable device 103 may receive sensor information from an external electronic device 590. For example, the sensor information may include a sensor value obtained by the external electronic device 590 through a sensor 593 of the external electronic device 590 and time information at which the sensor value is obtained. The sensor value may include a value representing a movement of the external electronic device 590. For example, the sensor 593 may include an acceleration sensor or a gyro sensor. For example, the time information may include a timing (e.g., a timestamp) at which the sensor value is obtained. The wearable device 103 and the external electronic device 590 may be synchronized with each other.

According to another embodiment, for example, the wearable device 103 may establish a connection with the external electronic device 590 through a communication circuit 540. For example, when a designated condition is satisfied, the wearable device 103 may transmit a signal requesting the sensor information to the external electronic device 590.

The designated condition may include a case in which an error between vision information obtained through an image sensor (or camera) of the wearable device 103 and a value indicating the movement of the wearable device 103 obtained using the sensor 530 occurs longer than or equal to a designated time length. The error may be referred to as tracking drift. Alternatively, for example, the designated condition may include a case in which the movement of the wearable device 103 recognized based on the value of the sensor 530 is identified as an abnormal movement. The abnormal movement may include a case in which the movement of the wearable device 103 recognized based on the value is not continuous. The designated condition may include a case in which an acceleration of the movement recognized based on the value of the sensor 530 is changed linearly. Alternatively, for example, the designated condition may include a case in which the wearable device 103 (or a user wearing the wearable device 103) is located within vehicles. For example, being located within the vehicles may be recognized based on the wearable device 103 detecting vibration according to an external factor.

According to another embodiment, when requesting the sensor information, the wearable device 103 may indicate an update period of the sensor information to be transmitted by the external electronic device 590. For example, the update period may include a designated time interval (e.g., minutes, seconds) or a designated number of times. The wearable device 103 may indicate an end time (timing) together with the update period. For example, the update period may be indicated for each sensor value. For example, when the amount of change in the acceleration of the wearable device 103 is large, the wearable device 103 may indicate a relatively short update period with respect to the acceleration sensor value to the external electronic device 590. When the amount of change in rotation information (or a value of the gyro sensor) of the wearable device 103 is small, the wearable device 103 may indicate a relatively long update period with respect to the gyro sensor value to the external electronic device 590.

According to still another embodiment, the external electronic device 590 may transmit the sensor information to the wearable device 103, based on a comparison between the obtained sensor information and the previous sensor information. For example, the external electronic device 590 may compare a reference difference with a difference between the sensor information obtained using the sensor 593 in a first period and other sensor information obtained using the sensor 593 in a second period before the first period. In this case, the other sensor information of the second period may be stored in memory of the external electronic device 590. In this case, the difference may include a difference $$\left( \sqrt{(x_2 - x_1)^2 + \ldots + (z_2 - z_1)^2} \right)$$

between a vector (e.g., (x1, y1, z1)) representing a sensor value of the sensor information and another vector (e.g., (x2, y2, z2)) representing a sensor value of the other sensor information. Alternatively, for example, the difference may include a difference between a value of at least some axis (e.g., x-axis, y-axis, or z-axis) of the vector and a value of the at least some axis of the other vector. Alternatively, when the value of the at least some axis (e.g., x-axis, y-axis, or z-axis) of the vector is a value outside a designated range, the external electronic device 590 may transmit the sensor information to the wearable device 103.

According to an embodiment, the sensor value included in the sensor information may be a text format or a binary format. The text format may include Plain, JSON, and XML. For example, the binary format may include Protobuf. When a connection state between the wearable device 103 and the external electronic device 590 is poor (e.g., detection of a data delay), data including the sensor value may be compressed and transmitted.

By transmitting and receiving the sensor information based on the comparison between the difference and the reference difference and/or the update period indicated by the wearable device 103, power consumption of the wearable device 103 and the external electronic device 590 may be reduced.

In the example, an example with respect to one external electronic device 590 is described, but the disclosure is not limited thereto. For example, the wearable device 103 may receive the sensor information from one or more external electronic devices.

In an embodiment, the wearable device 103 may receive (or obtain) the sensor information from the external electronic device 590 identified according to priority. For example, the priority may represent an order between one or more external electronic devices to request and receive the sensor information. In another embodiment, the priority may be determined by a user's input. For example, the wearable device 103 may set the priority between the one or more external electronic devices according to a state (e.g., walking or boarding vehicles) of the user, based on the user's input. For example, the wearable device 103 may request the sensor information from an external electronic device having the highest priority among the one or more external electronic devices, and receive the sensor information in response to the request. Alternatively, according to an embodiment, the priority may be determined based on record information. For example, the wearable device 103 may determine the priority, by using the record information including similarity values with respect to movement between the wearable device 103 and the one or more external electronic devices. For example, the record information may include the similarity values before a current time point. The priority may be determined according to a connection order between the one or more external electronic devices. The wearable device 103 may determine the priority corresponding to an order in which each of the one or more external electronic devices and the wearable device 103 are connected.

In operation 605, the wearable device 103 may obtain a value representing a movement of the wearable device 103 using at least one sensor 530. For example, the wearable device 103 may measure the value indicating the movement of the wearable device 103 using the sensor 530 at a designated timing. The designated timing may be included in the first period, and may be a timing after a timing at which the sensor information is received. The sensor 530 may include an IMU sensor.

In operation 610, the wearable device 103 may expect a value representing a movement of the external electronic device 590 based on the sensor information. For example, the wearable device 103 may calculate (or generate) a sensor value expected at the designated timing, by using the sensor information obtained in the first period and the other sensor information obtained in the second period. For another example, the expected sensor value may be a value representing the movement of the external electronic device 590. The expectation may be to compensate for an error between a timing at which the external electronic device 590 obtains the sensor information and a timing at which the wearable device 103 obtains the value. The error may include a time delay while the sensor information is transmitted from the external electronic device 590 to the wearable device 103, or a time delay while the wearable device 103 obtains the value.

The expected sensor value may be obtained (or calculated) using an operation algorithm or a statistical model (e.g., artificial intelligence (AI) model, machine learning, and deep learning). For example, an example of generating the expected sensor value may be referred to FIG. 7A below.

FIG. 7A illustrates an example 700 in which the wearable device 103 calculates the expected sensor value at a timing 712 (T2) in the first period 710, using the sensor information obtained in the first period 710 and the other sensor information obtained in the second period 720. The Timing 712 (T2) may be referred to as the designated timing.

Referring to the example 700, the wearable device 103 may receive the sensor information from the external electronic device 590 at a timing 711 (T1) of the first period 710. For example, the sensor information may include a sensor value obtained by the external electronic device 590 before the timing 711 (T1) and time information at which the sensor value is obtained. The wearable device 103 may obtain a value indicating a movement of the wearable device 103 using the sensor 530 of the wearable device 103 at the timing 712 (T2). The wearable device 103 may expect the movement of the external electronic device 590 at the timings 712 (T2). For example, the wearable device 103 may calculate the expected sensor value indicating the movement of the external electronic device 590 at the timing 712 (T2). For example, the expanded sensor value may be calculated by an operation algorithm such as the following equation.

$$S_{T2} = \frac{S_{T1} - S_{T2}}{T_{T1} - T_{T3}} \times (T_{T2} - T_{T1}) \qquad \text{Equation 1}$$

Equation 1 is merely an example to help understanding, and the embodiment of the disclosure may not be limited thereto. For example, Equation 1 may be modified, applied, or extended in various ways.

For example, the $S_{T2}$ may represent the expected sensor value at the timing 712 (T2), the $S_{T1}$ may represent a sensor value of the sensor information received at the timing 711 (T1), the $S_{T3}$ may represent a sensor value of the other sensor information received at the timing 721 (T3), the $T_{T1}$ may represent time information of the sensor information received at the timing 711 (T1), the $T_{T3}$ may represent time information of the other sensor information received at the timing 721 (T3), and the $T_{T2}$ may represent a timing at which the value representing the movement of the wearable device 103 is obtained.

According to one embodiment, the expected sensor value may be calculated using the sensor information obtained at the timing 711 (T1) of the first period 710 and the other sensor information obtained at the timing 721 (T3) of the second period 720. For example, the wearable device 103 may receive the other sensor information from the external electronic device 590 at the timing 721 (T3) of the second period 720 before the first period 710. The other sensor information may include another sensor value obtained by the external electronic device 590 before the timing 721 (T3), and another time information at which the other sensor value is obtained. The wearable device 103 may obtain another value representing a movement of the wearable device 103 at the timing 722 (T4) of the second period 720. At the timing 722 (T4) of the second period 720, the wearable device 103 may perform an expectation. Based on the other sensor information of the second period 720 and sensor information received at a third period (not illustrated), the expectation with respect to the timing 722 (T4) may be performed.

According to another embodiment, the wearable device 103 may store the expected sensor value. For example, the wearable device 103 may store the expected sensor value at the timing 712 (T2) in the memory 550. For example, the wearable device 103 may store the expected sensor value at the timing 722 (T4) in the memory 550.

In the example, an example of calculating the expected sensor value based on an operation algorithm such as the above-described equation is described, but the embodiments of the disclosure are not limited thereto. For example, the wearable device 103 may obtain (or calculate) the expected sensor value using an operation algorithm or a statistical model (e.g., artificial intelligence (AI) model, machine learning, and deep learning).

Referring back to FIG. 6, in operation 615, the wearable device 103 may calculate a similarity value between the movement of the wearable device 103 and the movement of the external electronic device 590. For example, the wearable device 103 may calculate the similarity value representing similarity between the value obtained at the designated timing and the expected sensor value. An example of a method of generating the similarity value is described with reference to FIG. 7B below.

Referring to FIG. 7B, an example 730 of a method of calculating the similarity value by the wearable device 103 is illustrated.

Referring to the example 730, an example of vectors 741 and 742 for values obtained through the sensor 530 of the wearable device 103 according to a movement 730-3 of the wearable device 103, an example of vectors 751 and 752 for sensor values obtained through a sensor of a first external electronic device according to a movement 730-1 of the first external electronic device, and an examples of vectors 761 and 762 for sensor values obtained through a sensor of a second external electronic device according to a movement 730-2 of the second external electronic device are illustrated. The first external electronic device and the second external electronic device may represent an example of the external electronic device 590.

Values obtained through the sensor 530 of the wearable device 103 may be vectorized with respect to a virtual point 740. For example, the point 740 may be (0, 0, 0). For example, a vector 741 ($V_{31}$) may be a vector (e.g., 1, 1, 1) for the value obtained at a first timing. In addition, for example, a vector 742 ($V_{32}$) may be a vector (e.g., 2, 2, 2) for the value obtained at a second timing after the first timing. For example, the first timing may be the timing 722 (T4) of the second period 720 of FIG. 7A. The second timing may be the timing 712 (T2) of the first period 710 of FIG. 7A.

Values obtained through the sensor of the first external electronic device may be vectorized with respect to a virtual point 750. For example, the point 750 may be (0, 0, 0). For example, a vector 751 ($V_{11}$) may be a vector (e.g., 1, 1, 1) for a sensor value of sensor information received at the first timing. In addition, for example, a vector 752 ($V_{12}$) may be a vector (e.g., 2, 1, 2) for the value obtained at the second timing. For example, the first timing may be the timing 722 (T4) of the second period 720 of FIG. 7A. The second timing may be the timing 712 (T2) of the first period 710 of FIG. 7A.

Values obtained through the sensor of the second external electronic device may be vectorized with respect to a virtual point 760. For example, the point 760 may be (0, 0, 0). For example, a vectors 761 ($V_{21}$) may be a vector (e.g., −1, −1, −1) for a sensor value of sensor information received at the first timing. In addition, for example, a vector 762 ($V_{22}$) may be a vector (e.g., −2, −2, −2) for the value obtained at the second timing. For example, the first timing may be the timing 722 (T4) of the second period 720 of FIG. 7A. The second timing may be the timing 712 (T2) of the first period 710 of FIG. 7A.

For convenience of description, in the example 730, the example 730 explains a case where the point 740, the point 750, and the point 760 are the same point, but the embodiment of the disclosure is not limited thereto. For example, as the wearable device 103, the first external electronic device, and the second external electronic device are located in different areas, and the point 740, the point 750, and the point 760 may be different from each other.

For example, a similarity evaluation (or calculation of a similarity value) based on a difference between vectors of the wearable device 103, the first external electronic device, and the second external electronic device may refer to the following equation.

$$V_{32} - V_{31} = (1, 1, 1) \quad |V_{32} - V_{31}| = \sqrt{3} \qquad \text{Equation 2}$$
$$V_{12} - V_{11} = (1, 0, 1) \quad |V_{12} - V_{11}| = \sqrt{2}$$
$$V_{22} - V_{21} = (-1, -1, -1) \quad |V_{22} - V_{21}| = \sqrt{3}$$

Equation 2 is merely an example to help understanding, and the embodiment of the disclosure may not be limited thereto. For example, Equation 2 may be modified, applied, or extended in various ways.

Referring to the described above, a similarity value between the wearable device 103 and the first external electronic device may be about 0.82 (=√2/√3), and a similarity value between the wearable device 103 and the second external electronic device may be $$1 \left( = \sqrt{3} \big/ \sqrt{3} \right).$$

According to an embodiment, the wearable device 103 may recognize that the movement of the wearable device 103 is relatively more similar (or the same) to the movement of the second external electronic device and is not relatively more similar to the first external electronic device.

Alternatively, for example, a similarity evaluation (or calculation of a similarity value) based on a cosine value between vectors of each of the wearable device 103, the first external electronic device, and the second external electronic device may refer to the following equation.

$$\cos \theta_3 = \frac{(V_{31}) \cdot (V_{32})}{|V_{31}||V_{32}|} = 1 \qquad \text{Equation 3}$$
$$\cos \theta_1 = \frac{(V_{12}) \cdot (V_{11})}{|V_{12}||V_{11}|} = 0.962$$
$$\cos \theta_2 = \frac{(V_{21}) \cdot (V_{22})}{|V_{21}||V_{22}|} = 1$$

Equation 3 is merely an example to help understanding, and the embodiment of the disclosure may not be limited thereto. For example, Equation 3 may be modified, applied, or extended in various ways.

Referring to the described above, a similarity value between the wearable device 103 and the first external electronic device may be about 0.962, and a similarity value between the wearable device 103 and the second external electronic device may be 1. According to an embodiment, the wearable device 103 may recognize that the movement of the wearable device 103 is relatively more similar (or the same) to the movement of the second external electronic device and is not relatively more similar to the first external electronic device.

In the example, an example in which a similarity value is calculated based on vectors of two timings (e.g., the first timing and the second timing) is described, but the embodiment of the disclosure is not limited thereto. For example, the similarity value may be calculated using vectors of three or more timings. In addition, in the example, an example of calculating the similarity value based on an operation algorithm such as the above-described equation is described, but the embodiments of the disclosure are not limited thereto. For example, the wearable device 103 may obtain (or calculate) the similarity value using the operation algorithm or a statistical model.

Referring back to FIG. 6, in operation 620, the wearable device 103 may determine whether the similarity value is greater than a reference value. For example, the wearable device 103 may compare the similarity value calculated according to a difference between vectors with the reference value. For example, about $$0.82 \left( = \sqrt{2} \big/ \sqrt{3} \right),$$

which is a similarity value between the wearable device 103 and the first external electronic device, may be compared with the reference value (e.g., 0.9). For example, the wearable device 103 may determine that the similarity value with respect to the first external electronic device is less than or equal to the reference value. In addition, for example, $$1 \left( = \sqrt{3} \big/ \sqrt{3} \right),$$

which is a similarity value between the wearable device 103 and the second external electronic device, may be compared with the reference value (e.g., 0.9). For example, the wearable device 103 may determine that the similarity value with respect to the second external electronic device is greater than the reference value.

In operation 620, the wearable device 103 may perform operation 625 according to determining that the similarity value is greater than the reference value. Alternatively, in operation 620, the wearable device 103 may perform operation 635 according to determining that the similarity value is less than or equal to the reference value.

In operation 625, the wearable device 103 may determine an application ratio. The wearable device 103 may determine the application ratio based on the magnitude (or an absolute value) of a difference between the similarity value and the reference value. For example, the application ratio may represent a ratio to be applied to adjustment with respect to the value representing the movement of the wearable device 103. For example, the application ratio may be referred to as a reference weight.

It is assumed that a first similarity value between the wearable device 103 and the first external electronic device is about 0.82, a second similarity value between the wearable device 103 and the second external electronic device is 1, a third similarity value between the wearable device 103 and a third external electronic device is 0.95, and the reference value is 0.9. In the example, the wearable device 103 may determine an application ratio of the first similarity to 0, with respect to the first similarity value less than or equal to the reference value. The wearable device 103 may determine an application ratio of the second similarity to 0.66 ($=(1-0.9)/\{(1-0.9)+(1-0.95)\}$) with respect to the second similarity value greater than the reference value. The wearable device 103 may determine an application ratio of the third similarity to 0.33 ($=(1-0.95)/\{(1-0.9)+(1-0.95)\}$) with respect to the third similarity value greater than or equal to the reference value. In this case, the application ratio may be used as a weight value (e.g., 0.66 or 0.33) for the adjustment.

Referring to operation 620 and operation 625, an example in which the wearable device 103 compares the reference value with a plurality of external electronic devices (e.g., the first external electronic device, the second external electronic device, and the third external electronic device) and determines an application ratio between the plurality of external electronic devices is described, but the embodiment of the disclosure is not limited thereto.

For example, when the wearable device 103 compares a similarity value for one external electronic device with the reference value, and the similarity value is less than or equal to the reference value, operation 625 may be omitted. In other words, when the similarity value for the one external electronic device is less than or equal to the reference value, the wearable device 103 may refrain from (or skip) adjusting of the value representing the movement of the wearable device 103 based on sensor information obtained from the one external electronic device.

When the wearable device 103 compares a similarity value for one external electronic device with the reference value, and the similarity value is greater than the reference value, operation 625 may be omitted. In other words, when the similarity value for the one external electronic device is greater than the reference value, the wearable device 103 may perform adjusting of the value representing the movement of the wearable device 103 in operation 630 based on sensor information obtained from the one external electronic device.

The wearable device 103 may compare similarity values for two external electronic devices (e.g., the first external electronic device and the second external electronic device) with the reference value, and perform adjusting of the value representing the movement of the wearable device 103 in operation 630 based on sensor information obtained from one external electronic device (e.g., the second external electronic device). Sensor information obtained from a remaining external electronic device (e.g., the first external electronic device) may not be used to adjust the value.

In operation 630, the wearable device 103 may adjust the value representing the movement of the wearable device 103. For example, the wearable device 103 may adjust the value based on the determined application ratio. The wearable device 103 may perform an offset (or compensation, cancellation) between the expected sensor value of the sensor information and the value. In other words, the wearable device 103 may correct the movement of the wearable device 103, based on information (e.g., the expected sensor value) representing the movement of the external electronic device 590. For example, an example of a method of performing adjustment of the values is described with reference to FIG. 7C below.

Referring to FIG. 7C, examples 770 and 780 of a method in which the wearable device 103 adjusts the value are illustrated. The examples 770 and 780 illustrate a method of adjusting the value based on sensor information of an external electronic device 590 which is the second external electronic device of FIG. 7B.

Referring to the example 770, vectors 741 and 742 related to the movement 730-3 of the wearable device 103 and vectors 761 and 762 related to the movement 730-2 of the second external electronic device are illustrated in a spatial domain. For convenience of description, the point 740 and the point 760 may be identical to each other. The point 740 and the point 760 may be the origin (0, 0, 0) in the spatial domain.

For example, the wearable device 103 may perform cross product for vectors. For example, the wearable device 103 may obtain a cross product vector 773 for vectors 741 and 742. The wearable device 103 may obtain a cross product vector 772 for vectors 761 and 772. The cross product vector 772 and the cross product vector 773 may be referred to as a reference vector. The wearable device 103 may, for example, obtain rotation parameters for aligning the cross product vector 772 with the cross product vector 773. For example, the rotation parameters may include a matrix for changing the cross product vector 772 to the cross product vector 773.

Referring to an example 780, the wearable device 103 may align the cross product vector 772 with the cross product vector 773, based on the rotation parameters. Accordingly, a plane (or a vector plane) formed by the vectors 761 and 762 may be aligned with a plane (or a vector plane) formed by the vectors 741 and 742. In other words, the vectors 761 and 762 may be aligned with the vectors 741 and 742, respectively. For example, the vectors 761 ($V_{21}$) may be aligned with the vectors 741 ($V_{31}$). In addition, for example, the vectors 762 ($V_{22}$) may be aligned with the vectors 742 ($V_{32}$).

Referring to the described above, the wearable device 103 may change the vectors 741 ($V_{31}$) based on the rotation parameters. A sensor value representing the vector 741 ($V_{31}$) (i.e., the vectors 741 ($V_{31}$) aligned with the vectors 761 ($V_{21}$)) changed based on the rotation parameters may be referred to as compensation. The compensation may be generated from a sensor value of sensor information obtained from the second external electronic device.

In an embodiment, the wearable device 103 may perform offset (or compensation, or cancellation) between the value representing the movement of the wearable device 103 and the compensation. Accordingly, the wearable device 103 may correct the tracking drift according to a factor different from the intention of a user of the wearable device 103.

Referring to the described above, an example of generating compensation for correcting of the value representing the movement of the wearable device 103 from a sensor value of one external electronic device (e.g., the second external electronic device) and performing the correction is described, but the embodiments of the disclosure are not limited thereto. The wearable device 103 may generate compensation for correcting of the value representing the movement of the wearable device 103 from sensor values of the plurality of external electronic devices (e.g., the second external electronic device and the third external electronic device) and perform the correction. For example, in operation 625, the compensation may be calculated based on the sum of a sensor value of the second external electronic device and a sensor value of the third external electronic device using the determined application ratio.

Referring back to FIG. 6, in operation 635, the wearable device 103 may display a screen based on the value representing the movement of the wearable device 103.

According to another embodiment, the wearable device 103 may display a screen according to the correction of the movement of the wearable device 103. For example, the wearable device 103 may display the screen based on the value representing the movement of the wearable device 103 adjusted using the compensation calculated through operation 630. For example, the screen may be displayed in a state in which the tracking drift is corrected, like as the screen 410 of FIG. 4A, unlike the screen 460 of FIG. 4B.

According to yet another embodiment, the wearable device 103 may display a screen on which the correction of the movement of the wearable device 103 has not been performed. For example, in operation 620, when the similarity value is less than or equal to the reference value, the wearable device 103 may display the screen based on the value representing the movement of the wearable device 103 obtained by the wearable device 103. For example, the screen may be displayed in a state in which the tracking drift is not corrected, like as the screen 410 of FIG. 4A.

According to still another embodiment, the wearable device 103 may receive sensor information from the external electronic device 590, calculate the similarity value from the sensor information, and correct the value representing the movement of the wearable device 103 for each designated time interval. For example, the designated time interval may represent the first period 710 and the second period 720 of FIG. 7A, respectively. In other words, the wearable device 103 may perform the above-described operations for each period.

When another designated condition is satisfied, the wearable device 103 may change a mode of the wearable device 103. For example, the other designated condition may include a case in which the value obtained by the wearable device 103 using the sensor 530 in operation 605 is greater than or equal to a threshold value, or a case in which the value cannot be obtained. For example, the threshold value may be used to indicate that the movement of the wearable device 103 recognized according to the value is abnormal. When the other designated condition is satisfied, the wearable device 103 may switch the mode to a passthrough mode of the wearable device 103. For example, the wearable device 103 may switch the mode from a mode providing a VR environment or an AR environment to the passthrough mode. The passthrough mode may indicate a mode of displaying (or penetrating) an external environment of the wearable device 103. Accordingly, the user of the wearable device 103 may secure safety.

Figure 8:
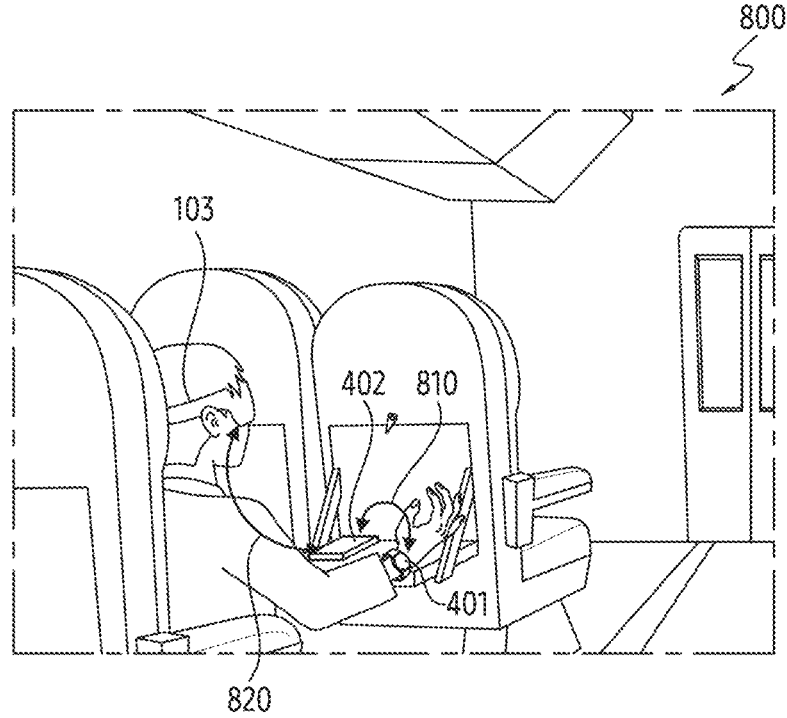
FIG. 8 illustrates an example of a wearable device using sensor information of a first external electronic device connected to a second external electronic device according to an embodiment of the disclosure.

FIG. 8 illustrates an example of a wearable device using sensor information of a first external electronic device connected to a second external electronic device according to an embodiment of the disclosure.

A wearable device 103 of FIG. 8 may be an example of the electronic device 101 of FIG. 1, the wearable device 103 of FIGS. 2A, 2B, 3A, and 3B, the wearable device 103 of FIGS. 4A and 4B, or the wearable device 103 of FIG. 5. A first external electronic device 401 of FIG. 8 may be an example of the first external electronic device 401 of FIGS. 4A and 4B. A second external electronic device 402 of FIG. 8 may be an example of the second external electronic device 402 of FIGS. 4A and 4B. For example, the first external electronic device 401 or the second external electronic device 402 may be an example of the external electronic device 590 of FIG. 5.

Referring to FIG. 8, an example 800 of a method in which the wearable device 103 corrects tracking drift using sensor information of the first external electronic device 401 connected to the second external electronic device 402 is illustrated.

Referring to example 800, the wearable device 103 may establish a connection 820 with the second external electronic device 402. The wearable device 103 may not establish a connection with the first external electronic device 401. For example, the wearable device 103 may be in a state in which a connection is established with the second external electronic device 402 among the first external electronic device 401 and the second external electronic device 402 and a connection is not established with the first external electronic device 401. The wearable device 103 may not be able to directly communicate with the first external electronic device 401. In this case, the first external electronic device 401 may establish a connection 810 with the second external electronic device 402.

According to an embodiment, the wearable device 103 may obtain second sensor information obtained through a sensor of the second external electronic device 402 from the second external electronic device 402, through the connection 820. For example, the second sensor information may include a sensor value obtained through a sensor of the second external electronic device 402 and time information.

The wearable device 103 may obtain first sensor information together with the second sensor information from the second external electronic device 402, through the connection 820. For example, the first sensor information may include a sensor value obtained through a sensor of the first external electronic device 401 and time information.

According to an embodiment, the wearable device 103 may adjust a value representing the movement of the wearable device 103 obtained through the sensor 530 of the wearable device 103, based on the first sensor information and the second sensor information. For example, the wearable device 103 may adjust the value representing the movement of wearable device 103, based on the second sensor information of the second external electronic device 402 directly connected to the wearable device 103 through the connection 820, and the first sensor information of the first external electronic device 401 connected to the second external electronic device 402 through the connection 810. In addition to a directly connected electronic device, the wearable device 103 may correct the tracking drift by using another electronic device connected to the directly connected electronic device. Accordingly, the wearable device 103 may more accurately track the user's body part (e.g., head part) of the wearable device 103, by correcting the tracking drift.

Figure 9:
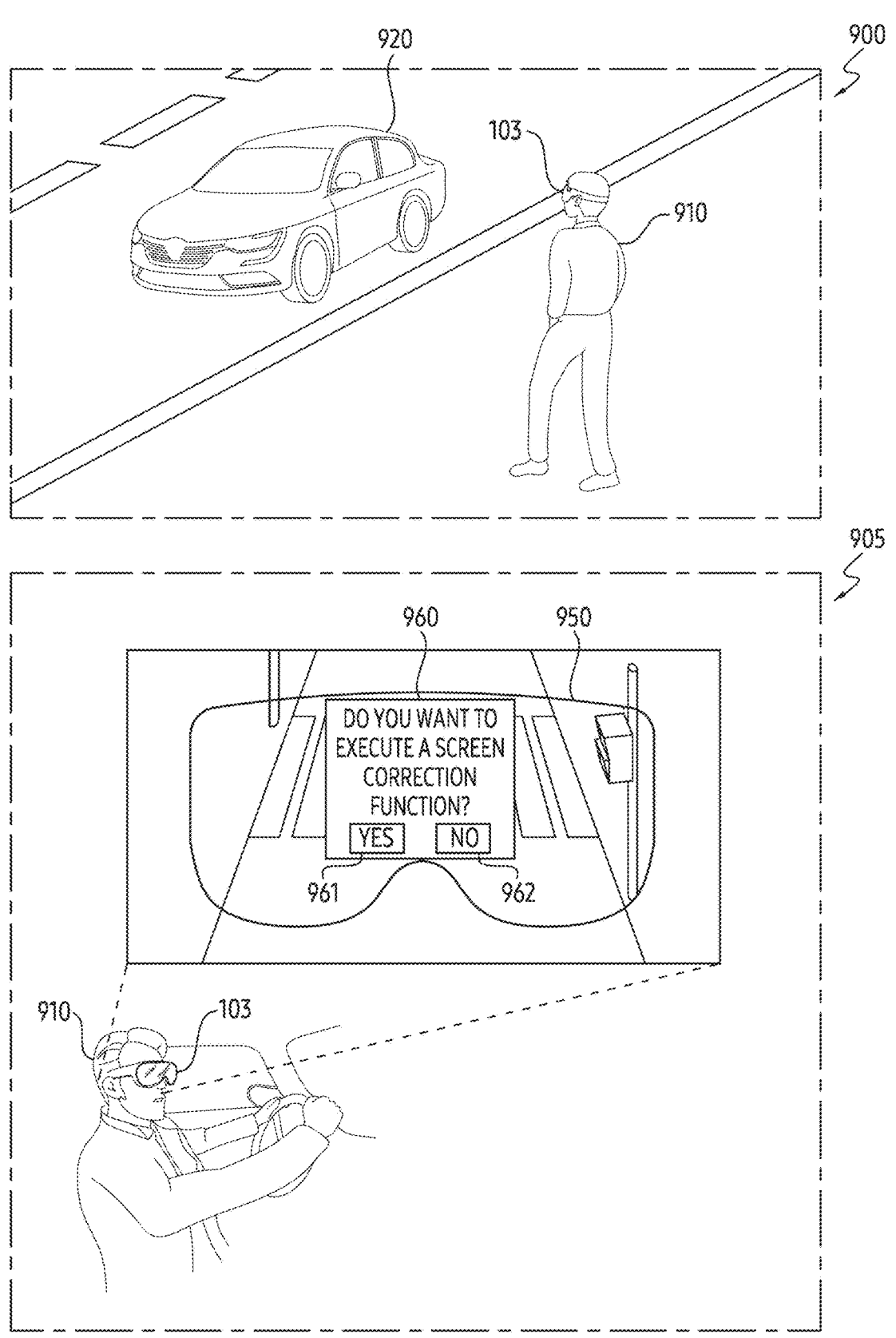
FIG. 9 illustrates an example of a visual object inquiring about execution of a function adjusting a value representing a movement of a wearable device according to an embodiment of the disclosure.

FIG. 9 illustrates an example of a visual object inquiring about execution of a function adjusting a value representing a movement of a wearable device according to an embodiment of the disclosure. For example, a wearable device 103 of FIG. 9 may be an example of the wearable device 103 of FIG. 5.

FIG. 9 illustrates examples 900 and 905 of a method of displaying a visual object 960 inquiring about execution of a function as a user 910 wearing the wearable device 103 boards a vehicle 920. That the user 910 boards the vehicle 920 may be understood that a designated condition is satisfied. In the examples 900 and 905 of FIG. 9, the vehicle 920 is illustrated as an example of vehicles, but the disclosure is not limited thereto.

Referring to the example 900, the wearable device 103 may be worn on a part of the user 910. For example, the wearable device 103 may be worn on the user 910's head. The wearable device 103 may determine whether the user 910 is located in the vehicle 920 while being worn on the body part. The wearable device 103 may recognize that the user 910 is located outside the vehicle 920 by detecting vibration due to an external factor.

Referring to the example 900 and the example 905, the user 910 may move into the vehicle 920. Accordingly, the wearable device 103 may detect that the user 910 is located inside the vehicle 920, and thus identify that the designated condition is satisfied. When the user 910 is located inside the vehicle 920, the wearable device 103 may recognize that the tracking drift is highly likely to occur. The wearable device 103 may inquire from the user 910 whether to execute the function for compensating for the tracking drift.

Referring to the example 905, the wearable device 103 may display a visual object 960 for inquiring about execution of the function from the user 910. For example, the wearable device 103 may display the visual object 960 in a state in which at least a portion of the screen 950 is overlapped. For example, the screen 950 may include a virtual environment (e.g., AR environment) based on an executing software application. The example 905 of FIG. 9 illustrates the visual object 960 displayed in a state in which at least a portion of the screen 950 is overlapped, but the disclosure is not limited thereto. For another example, the wearable device 103 may temporarily cease to display the screen 950 and display the visual object 960.

For example, the visual object 960 may include text inquiring about the execution of the function to the user 910. For example, the text may include "Do you want to execute a screen correction function?". However, the disclosure is not limited thereto. The screen correction function may indicate a function of compensating for the tracking drift. For example, the visual object 960 may include icons 961 and 962 for obtaining an input of the user 910. For example, the icon 961 may be used to execute the screen correction function. The icon 962 may be used to skip (or refrain from, delay) the execution of the screen correction function.

For example, as the user 910's input with respect to the icon 961 is obtained, the wearable device 103 may execute the function for compensating for the tracking drift. For example, the wearable device 103 may obtain sensor information from an external electronic device (e.g., the external electronic devices 401 and 402 of FIGS. 4A and 4B) to be connected to the wearable device 103 according to the execution of the function. The wearable device 103 may determine similarity with respect to a movement between the wearable device 103 and the external electronic device by using the obtained sensor information. For example, the wearable device 103 may identify a compensated movement value of the wearable device 103, by using sensor information of the external electronic device determined based on a result of the determination of the similarity. The compensated movement value may be identified using a value representing the movement of the wearable device 103 obtained through a sensor (e.g., the sensor 530 of FIG. 5) of the wearable device 103 and the sensor information. The wearable device 103 may compensate (or correct) the tracking drift using the compensated movement value. Accordingly, the wearable device 103 may display a screen in which the tracking drift is compensated, like as the screen 410 rather than the screen 460 of FIG. 4B.

FIG. 10 illustrates an example of an operation flow of a method of adjusting a value representing a movement of a wearable device based on a similarity value obtained using sensor information of external electronic devices according to an embodiment of the disclosure.

At least a portion of the method of FIG. 10 may be performed by the wearable device 103 of FIG. 5. For example, at least a portion of the method may be controlled by the processor 510 of the wearable device 103. In the following embodiment, each operation may be performed sequentially, but is not necessarily performed sequentially. The sequence of each operation may be changed, and at least two operations may be performed in parallel.

In operation 1010, the wearable device 103 may receive first sensor information of a first external electronic device and second sensor information of a second external electronic device. For example, the wearable device 103 may receive the first sensor information and the second sensor information through a communication circuit 540. For another example, the first external electronic device may be an example of the first external electronic device 401 of FIG. 8 or the first external electronic device 401 of FIGS. 4A and 4B. For example, the second external electronic device may be an example of the second external electronic device 402 of FIG. 8 or the second external electronic device 402 of FIGS. 4A and 4B. The first external electronic device or the second external electronic device may be an example of the external electronic device 590 of FIG. 5.

According to an embodiment, the wearable device 103 may establish a connection with each of the first external electronic device and the second external electronic device through the communication circuit 540. For example, the wearable device 103 may establish a connection with the first external electronic device using a first communication technique. For example, the wearable device 103 may establish a connection with the second external electronic device using a second communication technique. The first communication technique and the second communication technique may be the same or different from each other. The wearable device 103 may receive the first sensor information from the first external electronic device and the second sensor information from the second external electronic device.

According to another embodiment, when an external electronic device is a wearable device, the wearable device 103 may determine whether to establish the connection according to whether the external electronic device is worn. For example, it is assumed that the first external electronic device is a wearable device. When the first external electronic device is worn by the user, the wearable device 103 may establish the connection using the first communication technique. The wearable device 103 recognizing that the first external electronic device is worn by the user and establishing the connection may be understood substantially the same as the wearable device 103 determining to perform the adjustment based on data of the first external electronic device.

According to still another embodiment, the wearable device 103 may establish a connection with the second external electronic device through the communication circuit 540. The wearable device 103 may not establish a connection with the first external electronic device. In addition, the first external electronic device may establish a connection with the second external electronic device. The wearable device 103 may also receive the first sensor information together with the second sensor information, through the second external electronic device.

According to an embodiment, the first sensor information may include a first sensor value representing a movement of the first external electronic device and time information at which the first sensor value is obtained. For example, the first sensor value may include a value representing a movement of the first external electronic device. The first sensor value may include data obtained through an acceleration sensor or a gyro sensor of the first external electronic device. For example, the time information may include a timing (e.g., a timestamp) at which the first sensor value is obtained. In this case, the wearable device 103 and the first external electronic device may be synchronized with each other.

The second sensor information may include a second sensor value representing a movement of the second external electronic device and time information at which the second sensor value is obtained. For example, the second sensor value may include a value representing a movement of the second external electronic device. For example, the second sensor value may include data obtained through an acceleration sensor or a gyro sensor of the second external electronic device. For example, the time information may include a timing (e.g., a timestamp) at which the second sensor value is obtained. The wearable device 103 and the second external electronic device may be synchronized with each other.

According to yet another embodiment, when a designated condition is satisfied, the wearable device 103 may transmit a signal requesting the sensor information to the first external electronic device or the second external electronic device.

The designated condition may include a case in which an error between vision information obtained through an image sensor (or camera) of the wearable device 103 and a value representing the movement of the wearable device 103 obtained using the sensor 530 occurs longer than a designated time length. The error may be referred to as a tracking drift. Alternatively, for example, the designated condition may include a case in which the movement of the wearable device 103 recognized based on the value of the sensor 530 is identified as an abnormal movement. The abnormal movement may include a case in which the movement of the wearable device 103 recognized based on the value is not continuous. The designated condition may include a case in which an acceleration of the movement recognized based on the value of the sensor 530 is changed linearly. Alternatively, for example, the designated condition may include a case in which the wearable device 103 (or a user wearing the wearable device 103) is located within vehicles. For example, being located within the vehicles may be recognized based on the wearable device 103 detecting vibration according to an external factor.

According to an embodiment, when requesting the sensor information, the wearable device 103 may indicate an update period of the sensor information (e.g., the first sensor information or the second sensor information) to be transmitted by the first external electronic device or the second external electronic device. For example, the update period may include a designated time interval (e.g., minutes, seconds) or a designated number of times. The wearable device 103 may indicate an end time (timing) together with the update period. For example, the update period may be indicated for each sensor value (e.g., the first sensor value or the second sensor value). For example, when the amount of change in the acceleration of the wearable device 103 is large, the wearable device 103 may indicate a relatively short update period with respect to the acceleration sensor value to the first external electronic device or the second external electronic device. When the amount of change in rotation information (or a value of the gyro sensor) of the wearable device 103 is small, the wearable device 103 may indicate a relatively long update period with respect to the gyro sensor value to the first external electronic device or the second external electronic device.

According to an embodiment, the first external electronic device may transmit the first sensor information to the wearable device 103, based on a comparison between the obtained first sensor information and the previous sensor information. For example, the first external electronic device may compare reference difference with a difference between the first sensor information obtained using a sensor (e.g., the sensor 593 of FIG. 5) in a first period and third sensor information obtained using the sensor in a second period before the first period. In this case, the third sensor information in the second period may be stored in the first external electronic device. In this case, the difference may include a difference $$\left( \sqrt{(x_2 - x_1)^2 + \cdots + (z_2 - z_1)^2} \right)$$

between a vector (e.g., (x1, y1, z1)) representing a sensor value of the first sensor information and another vector (e.g., (x2, y2, z2)) representing a sensor value of the third sensor information of the second period. Alternatively, for example, the difference may include a difference between a value of at least some axis (e.g., x-axis, y-axis, or z-axis) of the vector and a value of the at least some axis of the other vector. Alternatively, when the value of the at least some axis (e.g., x-axis, y-axis, or z-axis) of the vector is a value outside a designated range, the first external electronic device may transmit the first sensor information to the wearable device 103.

According to an embodiment, the first sensor value included in the first sensor information may be a text format or a binary format. For example, the text format may include Plain, JSON, and XML. For example, the binary format may include Protobuf. When a connection state between the wearable device 103 and the first external electronic device is poor (e.g., detection of a data delay), data including the first sensor value may be compressed and transmitted. In the described above example, a compression transmission scheme of the data used when the connection state between the wearable device 103 and the first external electronic device is poor is described, but the embodiment of the disclosure is not limited thereto. For example, the data transmitted and received between the wearable device 103 and the first external electronic device may be compressed and transmitted regardless of the connection state.

By transmitting and receiving the sensor information based on the comparison between the difference and the reference difference and/or the update period indicated by the wearable device 103, power consumption of the wearable device 103 and the first external electronic device may be reduced. The described above example describes an example of the first sensor information and the first external electronic device, but the example may be applied substantially the same to the second sensor information and the second external electronic device.

The wearable device 103 may obtain a value representing a movement of the wearable device 103 using the sensor 530. For example, the wearable device 103 may measure the value representing the movement of the wearable device 103 using the sensor 530 at a designated timing. The designated timing may be included in the first period, and may be a timing after the timing at which the first sensor information (or the second sensor information) is received. For example, the sensor 530 may include an IMU sensor.

According to another embodiment, the wearable device 103 may expect a first value representing a movement of the first external electronic device, based on the first sensor information. For example, the wearable device 103 may calculate (or generate) a sensor value expected at the designated timing using the first sensor information obtained in the first period and the third sensor information obtained in the second period. For example, the first value may be a value representing the movement of the first external electronic device. The expectation may be to compensate for an error between a timing at which the first external electronic device obtains the first sensor information and a timing at which the wearable device 103 obtains the value. For example, the error may include a time delay while the first sensor information is transmitted from the first external electronic device to the wearable device 103, or a time delay while the wearable device 103 obtains the value.

The wearable device 103 may expect a second value representing a movement of the second external electronic device based on the second sensor information. For example, the wearable device 103 may calculate (or generate) a sensor value expected at the designated timing using the second sensor information obtained in the first period and fourth sensor information obtained in the second period. For another example, the second value may be a value representing the movement of the second external electronic device.

According to an embodiment, the first value (or the second value) may be obtained (or calculated) using an operation algorithm or a statistical model (e.g., artificial intelligence (AI) model, machine learning, and deep learning). For example, FIGS. 6 and 7A described above may be referred to as an example of a method of generating the expected sensor value.

In operation 1020, the wearable device 103 may obtain a first similarity value between the movement of the wearable device 103 and the movement of the first external electronic device. The wearable device 103 may calculate the first similarity value between the movement of the wearable device 103 and the movement of the first external electronic device. For example, the wearable device 103 may calculate the first similarity value indicating similarity between the value obtained at the designated timing and the first value.

In operation 1030, the wearable device 103 may obtain a second similarity value between the movement of the wearable device 103 and the movement of the second external electronic device. The wearable device 103 may calculate the second similarity value between the movement of the wearable device 103 and the movement of the second external electronic device. For example, the wearable device

103 may calculate the second similarity value indicating similarity between the value obtained at the designated timing and the second value.

For example, FIGS. 6 and 7B described above may be referred to as specific details on a method of generating the similarity value (e.g., the first similarity value or the second similarity value).

In operation 1040, the wearable device 103 may identify a compensated movement value of the wearable device 103 according to a result of a comparison between each of the first similarity value and the second similarity value and the reference value. The wearable device 103 may determine whether the similarity value is greater than a reference value. For example, the wearable device 103 may compare the similarity value calculated according to difference between vectors and the reference value. For example, the first similarity value between the wearable device 103 and the first external electronic device may be compared with the reference value.

For example, the wearable device 103 may determine that the first similarity value with respect to the first external electronic device is greater than the reference value. In addition, for example, the second similarity value between the wearable device 103 and the second external electronic device may be compared with the reference value. For example, the wearable device 103 may determine that the second similarity value with respect to the second external electronic device is less than or equal to the reference value. When the first similarity value is greater than the reference value and the second similarity value is less than or equal to the reference value, the wearable device 103 may identify the compensated movement value of the wearable device 103, based on the first sensor information and the value representing the movement of the wearable device 103. The wearable device 103 may determine that the first similarity value with respect to the first external electronic device is less than or equal to the reference value. For example, the wearable device 103 may determine that the second similarity value with respect to the second external electronic device is greater than the reference value. For example, when the first similarity value is less than or equal to the reference value and the second similarity value is greater than the reference value, the wearable device 103 may identify the compensated movement value of the wearable device 103, based on the second sensor information and the value representing the movement of the wearable device 103.

For example, the compensated movement value may indicate a value adjusted from the value representing the movement of the wearable device 103 or generated by the value. For example, the compensated movement value may be used to compensate for tracking drift. For another example, the compensated movement value may be identified based on the compensation (e.g., a sensor value representing the changed vector 741 ($V_{31}$) of FIG. 7B) and offset (or compensation, cancellation) of the value.

According to an embodiment, the wearable device 103 may determine an application ratio. For example, the wearable device 103 may determine the application ratio based on the magnitude (or an absolute value) of a difference between the similarity value and the reference value. The application ratio may represent a ratio to be applied to adjustment with respect to the value representing the movement of the wearable device 103. For example, the application ratio may be referred to as a reference weight.

It is assumed that the first similarity value between the wearable device 103 and the first external electronic device is 1, the second similarity value between the wearable device 103 and the second external electronic device is 0.8, and the reference value is 0.9. In the example, the wearable device 103 may determine the application ratio of the first similarity to 1, with respect to the first similarity value greater than the reference value. The wearable device 103 may determine the application ratio of the second similarity to 0, with respect to the second similarity value less than or equal to the reference value. The embodiments of the disclosure are not limited to the example.

For example, the wearable device 103 may compare the reference value with a similarity value with respect to one external electronic device, and when the similarity value with respect to the one external electronic device is less than or equal to the reference value, the wearable device 103 may refrain from (or skip) adjusting of the value representing the movement of the wearable device 103, based on sensor information obtained from the one external electronic device.

The wearable device 103 may compare the reference value with the similarity value with respect to one external electronic device, and when the similarity value with respect to the one external electronic device is greater than the reference value, the wearable device 103 may adjust the value representing the movement of the wearable device 103 based on sensor information obtained from the one external electronic device.

It is assumed that a first similarity value between the wearable device 103 and the first external electronic device is 1, a second similarity value between the wearable device 103 and the second external electronic device is about 0.82, a third similarity value between the wearable device 103 and a third external electronic device is 0.95, and the reference value is 0.9. The wearable device 103 may determine an application ratio of the first similarity to 0.66 (=(1−0.9)/{(1−0.9)+(1−0.95)}) with respect to the first similarity value greater than the reference value. The wearable device 103 may determine an application ratio of the second similarity to 0, with respect to the second similarity value less than or equal to the reference value. The wearable device 103 may determine an application ratio of the third similarity to 0.33 (=(1−0.95)/{(1−0.9)+(1−0.95)}), with respect to the third similarity value greater than the reference value. The application ratio may be used as a weight value (e.g., 0.66 or 0.33) for the adjustment.

According to an embodiment, the wearable device 103 may adjust the value representing the movement of the wearable device 103. For example, the wearable device 103 may adjust the value based on the determined application ratio. The wearable device 103 may, for example, perform an offset (or compensation, or cancellation) between the first value of the first sensor information and the value. In other words, the wearable device 103 may correct the movement of the wearable device 103, based on information (e.g., the first value) representing the movement of the first external electronic device. Specific details on a method of performing the adjustment of the value may be referred to FIGS. 6 and 7C described above.

According to another embodiment, the wearable device 103 may perform an offset (or compensation, or cancellation) between a compensation changed (or generated) from the first value and the value representing the movement of the wearable device 103. Accordingly, the wearable device 103 may correct the tracking drift according to a factor different from the intention of the user of the wearable device 103.

Referring to the described above, an example of performing a correction by generating the compensation for correcting the value representing the movement of the wearable device 103 from the first sensor value of one external electronic device (e.g., the first external electronic device) and generating the compensated movement value using the compensation and the value is described, but the embodiments of the disclosure are not limited thereto. For example, the wearable device 103 may generate a compensation for correcting the value representing the movement of the wearable device 103 from sensor values of the plurality of external electronic devices (e.g., the first external electronic device and the third external electronic device), and perform the correction. The compensation may be calculated based on the sum of the first sensor value of the first external electronic device and the third sensor value of the third external electronic device using the application ratio.

In operation 1050, the wearable device 103 may display a screen according to the compensated movement value. For example, the wearable device 103 may display the screen according to the compensated movement value through the display 520.

According to one embodiment, the wearable device 103 may display a screen according to the correction of the movement of the wearable device 103. For example, the wearable device 103 may display the screen according to the compensated movement value generated (or adjusted) based on the compensation and the value representing the movement of the wearable device 103. The screen may be displayed in a state in which the tracking drift is corrected, like as the screen 410 of FIG. 4A, unlike the screen 460 of FIG. 4B.

According to another embodiment, the wearable device 103 may receive the first sensor information from the first external electronic device, calculate the first similarity value from the first sensor information, and perform a correction of the value representing the movement of the wearable device 103 for each designated time interval. For example, the designated time interval may represent the first period 710 and the second period 720 of FIG. 7A, respectively. In other words, the wearable device 103 may perform the above-described operations for each period.

According to yet another embodiment, when another designated condition is satisfied, the wearable device 103 may change a mode of the wearable device 103. For example, the other designated condition may include a case in which the value obtained by the wearable device 103 using the sensor 530 is greater than or equal to a threshold value, or a case in which the value cannot be obtained. For example, the threshold value may be used to indicate that the movement of the wearable device 103 recognized according to the value is abnormal. For example, when the other designated condition is satisfied, the wearable device 103 may switch the mode to a passthrough mode of the wearable device 103. The wearable device 103 may switch the mode from a mode providing VR environment or AR environment to the passthrough mode. The passthrough mode may indicate a mode of displaying (or penetrating) an external environment of the wearable device 103. Accordingly, the user of the wearable device 103 may secure safety.

Hereinafter, a device and a method according to embodiments of the disclosure may correct (or improve) a tracking drift by correcting a value obtained by the wearable device 103 using sensor information of an external electronic device connected to the wearable device 103. In this case, the device and the method according to the embodiments of the disclosure may reduce power consumption by obtaining the sensor information satisfying a designated condition from the external electronic device. When the external electronic device is a plurality of external electronic devices, the device and the method according to the embodiments of the disclosure may determine an application ratio for the correction according to similarity between movement of each of the plurality of external electronic devices and the movement of the wearable device 103, and perform the correction using the determined application ratio. Accordingly, the device and the method according to the embodiments of the disclosure may more accurately perform a correction on the tracking drift and tracking (e.g., HeT) the user's body part.

As described above, a wearable device 103 may comprise memory 550, one or more storage mediums, storing instructions. The wearable device 103 may comprise a sensor 530. The wearable device 103 may comprise a communication circuit 540. The wearable device 103 may comprise at least one processor 510 comprising processing circuitry. The instructions, when executed by the at least one processor 510 individually or collectively, may cause the wearable device 103 to receive, through the communication circuit 540, first sensor information of a first external electronic device and second sensor information of a second external electronic device. The instructions, when executed by the at least one processor 510 individually or collectively, may cause the wearable device 103 to obtain a first similarity value between a movement of the wearable device 103 and a movement of the first external electronic device based on a value representing the movement of the wearable device 103 obtained through the sensor 530 and the first sensor information. The instructions, when executed by the at least one processor 510 individually or collectively, may cause the wearable device 103 to obtain a second similarity value between the movement of the wearable device 103 and a movement of the second external electronic device based on the value and the second sensor information. The instructions, when executed by the at least one processor 510 individually or collectively, may cause the wearable device 103 to, in case that the first similarity value is greater than a reference value and the second similarity value is less than or equal to the reference value, identify a compensated movement value of the wearable device 103 based on the value representing the movement of the wearable device 103 and the first sensor information. The instructions, when executed by the at least one processor 510 individually or collectively, may cause the wearable device 103 to, in case that the second similarity value is greater than the reference value and the first similarity value is less than or equal to the reference value, identify a compensated movement value of the wearable device 103 based on the value representing the movement of the wearable device 103 and the second sensor information. The instructions, when executed by the at least one processor 510 individually or collectively, may cause the wearable device 103 to display a screen according to the compensated movement value.

According to an embodiment, the first sensor information may include a first sensor value representing the movement of the first electronic device and time information when the first sensor value is obtained. The second sensor information may include a second sensor value representing the movement of the second electronic device and time information when the second sensor value is obtained.

According to an embodiment, the instructions, when executed by the at least one processor 510 individually or collectively, may cause the wearable device 103 to establish, through the communication circuit 540, a connection with the first external electronic device. The second external electronic device may be connected to the first external electronic device. The second sensor information of the second external electronic device may be received together with the first sensor information through the first external electronic device.

According to an embodiment, the instructions, when executed by the at least one processor 510 individually or collectively, may cause the wearable device 103 to transmit a signal requesting the first sensor information and the second sensor information in case that a designated condition is satisfied. The designated condition may comprise at least one of a case in which an error between the value and vision data obtained through a camera of the wearable device 103 is greater than a reference error, a case in which an acceleration of the wearable device 103 based on the value is linearly changed, or a case in which a user wearing the wearable device 103 is positioned in a vehicle.

According to an embodiment, the instructions, when executed by the at least one processor 510 individually or collectively, may cause the wearable device 103 to obtain the value representing the movement of the wearable device 103 through the sensor 530 at a timing in a first period after receiving the first sensor information and the second sensor information in the first period. The instructions, when executed by the at least one processor 510 individually or collectively, may cause the wearable device 103 to obtain a first value representing the movement of the first external electronic device expected at the timing based on third sensor information of the first external electronic device obtained in a second period before the first period and the first sensor information. The instructions, when executed by the at least one processor 510 individually or collectively, may cause the wearable device 103 to obtain a second value representing the movement of the second external electronic device expected at the timing based on fourth sensor information of the second external electronic device obtained in the second period and the second sensor information.

According to an embodiment, the first value may be obtained based on at least one of a difference between the first sensor information and the third sensor information or a statistical model for expecting the movement of the first external electronic device. The second value may be obtained based on at least one of a difference between the second sensor information and the fourth sensor information or a statistical model for expecting the movement of the second external electronic device.

According to an embodiment, a difference between the first sensor information and the third sensor information may be greater a reference difference. A difference between the second sensor information and the fourth sensor information may be greater the reference difference.

According to an embodiment, the instructions, when executed by the at least one processor 510 individually or collectively, may cause the wearable device 103 to obtain a first vector between the value and another value obtained through the sensor 530 at another timing in the second period. The instructions, when executed by the at least one processor 510 individually or collectively, may cause the wearable device 103 to obtain a second vector between the first value and a third value representing a movement of the first external electronic device expected with respect to the other timing based on the third sensor information. The instructions, when executed by the at least one processor 510 individually or collectively, may cause the wearable device 103 to obtain a third vector between the second value and a fourth value representing a movement of the second external electronic device expected with respect to the other timing based on the fourth sensor information.

According to an embodiment, the instructions, when executed by the at least one processor 510 individually or collectively, may cause the wearable device 103 to obtain the first similarity value based on the first vector and the second vector. The instructions, when executed by the at least one processor 510 individually or collectively, may cause the wearable device 103 to obtain the second similarity value based on the first vector and the third vector.

According to an embodiment, the instructions, when executed by the at least one processor 510 individually or collectively, may cause the wearable device 103 to obtain a first reference vector based on the value and the other value in response to the first similarity value greater than the reference value. The instructions, when executed by the at least one processor 510 individually or collectively, may cause the wearable device 103 to obtain a second reference vector based on the first value and the third value in response to the first similarity value greater than the reference value. The instructions, when executed by the at least one processor 510 individually or collectively, may cause the wearable device 103 to obtain rotation parameters for changing to align the second reference vector with the first reference vector. The instructions, when executed by the at least one processor 510 individually or collectively, may cause the wearable device 103 to obtain a compensation value from the first sensor value based on the rotation parameters.

According to an embodiment, the first reference vector may be obtained using cross product for the value and the other value. The second reference vector may be obtained using cross product for the first value and the third value.

According to an embodiment, the compensated movement value may be identified based on cancellation between the value and the compensation value.

According to an embodiment, the instructions, when executed by the at least one processor 510 individually or collectively, may cause the wearable device 103 to receive, through the communication circuit 540, third sensor information of a third external electronic device. The instructions, when executed by the at least one processor 510 individually or collectively, may cause the wearable device 103 to obtain a third similarity value between the movement of the wearable device 103 and a movement of the third external electronic device based on the value and the third sensor information. The third similarity value may be greater than the first similarity value. The instructions, when executed by the at least one processor 510 individually or collectively, may cause the wearable device 103 to generate a first weight according to the first similarity value and the reference value and a second weight according to the third similarity value and the reference value. The instructions, when executed by the at least one processor 510 individually or collectively, may cause the wearable device 103 to identify another compensated movement value based on the first sensor information to which the first weight is applied, the third sensor information to which the second weight is applied, and the value. The instructions, when executed by the at least one processor 510 individually or collectively, may cause the wearable device 103 to display a screen according to the other compensated movement value. The second weight may be greater than the first weight.

According to an embodiment, the value representing the movement of the wearable device 103 may comprise acceleration information and rotation information obtained through the sensor 530.

As described above, a wearable device 103 may comprise memory 550, comprising one or more storage mediums, storing instructions. The wearable device 103 may comprise a sensor 530. The wearable device 103 may comprise a communication circuit 540. The wearable device 103 may comprise at least one processor 510 comprising processing circuitry. The instructions, when executed by the at least one processor 510 individually or collectively, may cause the wearable device 103 to establish, through the communication circuit 540, a connection with an external electronic device. The instructions, when executed by the at least one processor 510 individually or collectively, may cause the wearable device 103 to receive, from the external electronic device, sensor information including a sensor value and a first timing when the sensor value is obtained. The instructions, when executed by the at least one processor 510 individually or collectively, may cause the wearable device 103 to obtain, through the sensor 530, a value representing a movement of the wearable device 103 at a second timing after the first timing. The instructions, when executed by the at least one processor 510 individually or collectively, may cause the wearable device 103 to calculate a first vector for the movement of the wearable device 103 based on the value and another value obtained through the sensor 530 at a third timing before the first timing. The instructions, when executed by the at least one processor 510 individually or collectively, may cause the wearable device 103 to calculate a second vector for a movement of the external electronic device based on the sensor value and another sensor value calculated with respect to the third timing. The instructions, when executed by the at least one processor 510 individually or collectively, may cause the wearable device 103 to obtain a similarity value between the movement of the wearable device 103 and the movement of the external electronic device based on the first vector and the second vector. The instructions, when executed by the at least one processor 510 individually or collectively, may cause the wearable device 103 to adjust the value representing the movement of the wearable device 103 using the sensor value based on the similarity value greater than a reference value.

According to an embodiment, the instructions, when executed by the at least one processor 510 individually or collectively, may cause the wearable device 103 to determine whether the similarity value is greater than the reference value. The instructions, when executed by the at least one processor 510 individually or collectively, may cause the wearable device 103 to maintain the value in case that the similarity value is less than or equal to the reference value. The value may be used to displaying of contents provided by the wearable device 103.

As described above, a method performed by a wearable device 103 may comprise receiving first sensor information of a first external electronic device and second sensor information of a second external electronic device. The method may comprise obtaining a first similarity value between a movement of the wearable device 103 and a movement of the first external electronic device based on a value representing the movement of the wearable device 103 and the first sensor information. The method may comprise obtaining a second similarity value between the movement of the wearable device 103 and a movement of the second external electronic device based on the value and the second sensor information. The method may comprise adjusting the value representing the movement of the wearable device 103 using the first sensor information, based on the first similarity value greater than a reference value and the second similarity value less than or equal to the reference value. The method may comprise, in case that the first similarity value is greater than a reference value and the second similarity value is less than or equal to the reference value, identifying a compensated movement value of the wearable device 103 based on the value representing the movement of the wearable device 103 and the first sensor information. The method may comprise, in case that the second similarity value is greater than the reference value and the first similarity value is less than or equal to the reference value, identifying a compensated movement value of the wearable device 103 based on the value representing the movement of the wearable device 103 and the second sensor information. The method may comprise displaying a screen according to the compensated movement value.

According to an embodiment, the method may comprise obtaining the value representing the movement of the wearable device 103 at a timing in a first period after receiving the first sensor information and the second sensor information in the first period. The method may comprise obtaining a first value representing the movement of the first external electronic device expected at the timing based on third sensor information of the first external electronic device obtained in a second period before the first period and the first sensor information. The method may comprise obtaining a second value representing the movement of the second external electronic device expected at the timing based on fourth sensor information of the second external electronic device obtained in the second period and the second sensor information.

According to an embodiment, the method may comprise obtaining a first vector between the value and another value obtained at another timing in the second period. The method may comprise obtaining a second vector between the first value and a third value representing a movement of the first external electronic device expected with respect to the other timing based on the third sensor information. The method may comprise obtaining a third vector between the second value and a fourth value representing a movement of the second external electronic device expected with respect to the other timing based on the fourth sensor information.

As described above, a non-transitory computer-readable storage medium, when individually or collectively executed by at least one processor 510 of a wearable device 103 comprising a sensor 530 and a communication circuit 540, may store one or more programs including instructions that cause to receive, through the communication circuit 540, first sensor information of a first external electronic device and second sensor information of a second external electronic device. The non-transitory computer-readable storage medium, when individually or collectively executed by the at least one processor 510, may store one or more programs including instructions that cause obtain a first similarity value between a movement of the wearable device 103 and a movement of the first external electronic device based on a value representing the movement of the wearable device 103 obtained through the sensor 530 and the first sensor information. The non-transitory computer-readable storage medium, when individually or collectively executed by the at least one processor 510, may store one or more programs including instructions that cause obtain a second similarity value between the movement of the wearable device 103 and a movement of the second external electronic device based on the value and the second sensor information. The non-transitory computer-readable storage medium, when individually or collectively executed by the at least one processor 510, may store one or more programs including instructions that cause, in case that the first similarity value is greater than a reference value and the second similarity value is less than or equal to the reference value, identify a compensated movement value of the wearable device 103 based on the value representing the movement of the wearable device 103 and the first sensor information. The non-transitory computer-readable storage medium, when individually or collectively executed by the at least one processor 510, may store one or more programs including instructions that cause, in case that the second similarity value is greater than the reference value and the first similarity value is less than or equal to the reference value, identify a compensated movement value of the wearable device 103 based on the value representing the movement of the wearable device 103 and the second sensor information. The non-transitory computer-readable storage medium, when individually or collectively executed by the at least one processor 510, may store one or more programs including instructions that cause display a screen according to the compensated movement value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). A processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

In an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules). The one or more computer programs include computer-executable instructions (or instructions) that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

No claim element is to be construed under the provisions of 35 U.S.C. § 112, sixth paragraph, unless the element is expressly recited using the phrase "means for" or "means".

What is claimed is:

1. A wearable device comprising:

memory, one or more storage mediums, storing instructions;

a sensor;

a communication circuit; and at least one processor comprising processing circuitry, wherein the instructions, when executed by the at least one processor individually or collectively, cause the wearable device to:

receive, through the communication circuit, first sensor information of a first external electronic device and second sensor information of a second external electronic device, obtain a first similarity value between a movement of the wearable device and a movement of the first external electronic device based on a value representing the movement of the wearable device obtained through the sensor and the first sensor information, obtain a second similarity value between the movement of the wearable device and a movement of the second external electronic device based on the value and the second sensor information, in case that the first similarity value is greater than a reference value and the second similarity value is less than or equal to the reference value, identify a compensated movement value of the wearable device based on the value representing the movement of the wearable device and the first sensor information, in case that the second similarity value is greater than the reference value and the first similarity value is less than or equal to the reference value, identify a compensated movement value of the wearable device based on the value representing the movement of the wearable device and the second sensor information, and display a screen according to the compensated movement value.

2. The wearable device of claim 1, wherein the first sensor information includes a first sensor value representing the movement of the first external electronic device and time information when the first sensor value is obtained, and wherein the second sensor information includes a second sensor value representing the movement of the second external electronic device and time information when the second sensor value is obtained.

3. The wearable device of claim 1,
wherein the instructions, when executed by the at least one processor individually or collectively, cause the wearable device to:
establish, through the communication circuit, a connection with the first external electronic device,
wherein the second external electronic device is connected to the first external electronic device, and
wherein the second sensor information of the second external electronic device is received together with the first sensor information through the first external electronic device.

4. The wearable device of claim 1,
wherein the instructions, when executed by the at least one processor individually or collectively, cause the wearable device to:
transmit a signal requesting the first sensor information and the second sensor information in case that a designated condition is satisfied,
wherein the designated condition comprises at least one of:
a case in which an error between the value and vision data obtained through a camera of the wearable device is greater than a reference error,
a case in which an acceleration of the wearable device based on the value is linearly changed, or
a case in which a user wearing the wearable device is positioned in a vehicle.

5. The wearable device of claim 1,
wherein the instructions, when executed by the at least one processor individually or collectively, cause the wearable device to:
obtain the value representing the movement of the wearable device through the sensor at a timing in a first period after receiving the first sensor information and the second sensor information in the first period,
obtain a first value representing the movement of the first external electronic device expected at the timing based on third sensor information of the first external electronic device obtained in a second period before the first period and the first sensor information, and
obtain a second value representing the movement of the second external electronic device expected at the timing based on fourth sensor information of the second external electronic device obtained in the second period and the second sensor information.

6. The wearable device of claim 5,
wherein the first value is obtained based on at least one of a difference between the first sensor information and the third sensor information or a statistical model for expecting the movement of the first external electronic device, and
wherein the second value is obtained based on at least one of a difference between the second sensor information and the fourth sensor information or a statistical model for expecting the movement of the second external electronic device.

7. The wearable device of claim 5,
wherein a difference between the first sensor information and the third sensor information is greater a reference difference, and
wherein a difference between the second sensor information and the fourth sensor information is greater the reference difference.

8. The wearable device of claim 5, wherein the instructions, when executed by the at least one processor individually or collectively, cause the wearable device to:

obtain a first vector between the value and another value obtained through the sensor at another timing in the second period;
obtain a second vector between the first value and a third value representing a movement of the first external electronic device expected with respect to the another timing based on the third sensor information; and
obtain a third vector between the second value and a fourth value representing a movement of the second external electronic device expected with respect to the another timing based on the fourth sensor information.

9. The wearable device of claim 8, wherein the instructions, when executed by the at least one processor individually or collectively, cause the wearable device to:
obtain the first similarity value based on the first vector and the second vector; and
obtain the second similarity value based on the first vector and the third vector.

10. The wearable device of claim 8, wherein the instructions, when executed by the at least one processor individually or collectively, cause the wearable device to:
obtain a first reference vector based on the value and the another value in response to the first similarity value greater than the reference value;
obtain a second reference vector based on the first value and the third value in response to the first similarity value greater than the reference value;
obtain rotation parameters for changing to align the second reference vector with the first reference vector; and
obtain a compensation value from the first sensor information based on the rotation parameters.

11. The wearable device of claim 10,
wherein the first reference vector is obtained using cross product for the value and the another value, and
wherein the second reference vector is obtained using cross product for the first value and the third value.

12. The wearable device of claim 10, wherein the compensated movement value is identified based on cancellation between the value and the compensation value.

13. The wearable device of claim 1, wherein the instructions, when executed by the at least one processor individually or collectively, cause the wearable device to:
receive, through the communication circuit, third sensor information of a third external electronic device;
obtain a third similarity value between the movement of the wearable device and a movement of the third external electronic device based on the value and the third sensor information, wherein the third similarity value is greater than the first similarity value;
generate a first weight according to the first similarity value and the reference value and a second weight according to the third similarity value and the reference value;
identify another compensated movement value based on the first sensor information to which the first weight is applied, the third sensor information to which the second weight is applied, and the value; and
display a screen according to the another compensated movement value, wherein the second weight is greater than the first weight.

14. A method performed by a wearable device, the method comprising:
receiving first sensor information of a first external electronic device and second sensor information of a second external electronic device;

obtaining a first similarity value between a movement of the wearable device and a movement of the first external electronic device based on a value representing the movement of the wearable device and the first sensor information;

obtaining a second similarity value between the movement of the wearable device and a movement of the second external electronic device based on the value and the second sensor information;

in case that the first similarity value is greater than a reference value and the second similarity value is less than or equal to the reference value, identifying a compensated movement value of the wearable device based on the value representing the movement of the wearable device and the first sensor information;

in case that the second similarity value is greater than the reference value and the first similarity value is less than or equal to the reference value, identifying a compensated movement value of the wearable device based on the value representing the movement of the wearable device and the second sensor information; and displaying a screen according to the compensated movement value.

15. The method of claim 14, the method comprising:

obtaining the value representing the movement of the wearable device at a timing in a first period after receiving the first sensor information and the second sensor information in the first period;

obtaining a first value representing the movement of the first external electronic device expected at the timing based on third sensor information of the first external electronic device obtained in a second period before the first period and the first sensor information; and obtaining a second value representing the movement of the second external electronic device expected at the timing based on fourth sensor information of the second external electronic device obtained in the second period and the second sensor information.

16. The method of claim 15, the method comprising:

obtaining a first vector between the value and another value obtained at another timing in a second period;

obtaining a second vector between the first value and a third value representing a movement of the first external electronic device expected with respect to the another timing based on a third sensor information; and obtaining a third vector between the second value and a fourth value representing a movement of the second external electronic device expected with respect to the another timing based on a fourth sensor information.

17. The method of claim 16, the method comprising:

obtaining the first similarity value based on the first vector and the second vector; and obtaining the second similarity value based on the first vector and the third vector.

18. The method of claim 16, the method comprising:

obtaining a first reference vector based on the value and the another value in response to the first similarity value greater than the reference value;

obtaining a second reference vector based on the first value and the third value in response to the first similarity value greater than the reference value;

obtaining rotation parameters for changing to align the second reference vector with the first reference vector; and obtaining a compensation value from the first sensor information based on the rotation parameters.

19. The method of claim 18, wherein the first reference vector is obtained using cross product for the value and the another value, and wherein the second reference vector is obtained using cross product for the first value and the third value.

20. One or more non-transitory computer-readable storage media storing one or more computer programs including computer-executable instructions that, when executed by one or more processors of a wearable device individually or collectively, cause the wearable device comprising a sensor and a communication circuit to perform operations, the operations comprising:

receiving, through the communication circuit, first sensor information of a first external electronic device and second sensor information of a second external electronic device;

obtaining a first similarity value between a movement of the wearable device and a movement of the first external electronic device based on a value representing the movement of the wearable device obtained through the sensor and the first sensor information;

obtaining a second similarity value between the movement of the wearable device and a movement of the second external electronic device based on the value and the second sensor information;

in case that the first similarity value is greater than a reference value and the second similarity value is less than or equal to the reference value, identifying a compensated movement value of the wearable device based on the value representing the movement of the wearable device and the first sensor information;

in case that the second similarity value is greater than the reference value and the first similarity value is less than or equal to the reference value, identifying a compensated movement value of the wearable device based on the value representing the movement of the wearable device and the second sensor information; and displaying a screen according to the compensated movement value.

* * * * *